United States Patent
Saarikko et al.

(10) Patent No.: US 9,429,692 B1
(45) Date of Patent: Aug. 30, 2016

(54) OPTICAL COMPONENTS

(71) Applicant: Microsoft Technology Licensing, LLC, Redmond, WA (US)

(72) Inventors: Pasi Saarikko, Espoo (FI); Pasi Kostamo, Espoo (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/617,746

(22) Filed: Feb. 9, 2015

(51) Int. Cl.
G02B 6/34 (2006.01)
G02B 5/18 (2006.01)
G02B 27/01 (2006.01)

(52) U.S. Cl.
CPC ........... G02B 5/1852 (2013.01); G02B 5/1866 (2013.01); G02B 27/0172 (2013.01)

(58) Field of Classification Search
CPC .......... G02B 6/34; G02B 2006/12107; G02B 6/02085; G02B 6/12009; G02B 6/29308; G02B 2006/02166; G02B 6/02057; G02B 6/02095; H01S 5/141; H01S 5/1209; H01S 5/1212
USPC ..................... 385/37; 425/150; 264/1.37, 1.1; 359/569
See application file for complete search history.

(56) References Cited

U.S. PATENT DOCUMENTS

| | | |
|---|---|---|
| 3,227,888 A | 1/1966 | Turnbull et al. |
| 3,542,453 A | 11/1970 | Kantor |
| 3,836,258 A | 9/1974 | Courten et al. |
| 3,906,528 A | 9/1975 | Johnson |
| 3,971,065 A | 7/1976 | Bayer |
| 4,200,395 A | 4/1980 | Smith et al. |
| 4,294,507 A | 10/1981 | Johnson |
| 4,402,610 A | 9/1983 | Lacombat |
| 4,664,524 A | 5/1987 | Hattori et al. |

(Continued)

FOREIGN PATENT DOCUMENTS

| | | |
|---|---|---|
| CN | 1440513 | 9/2003 |
| CN | 101029968 | 9/2007 |

(Continued)

OTHER PUBLICATIONS

"International Search Report and Written Opinion", Application No. PCT/US2015/042371, Oct. 2, 2015, 10 pages.

(Continued)

*Primary Examiner* — Ellen Kim
(74) *Attorney, Agent, or Firm* — Micah Goldsmith; Judy Yee; Micky Minhas

(57) ABSTRACT

A substantially transparent optical component, which comprises polymer, is molded. The optical component has substantially matching grating imprints on respective portions of its surface, which imprints have a substantially zero relative orientation angle. Substantially transparent molten polymer is forced between two surfaces of a molding component. The molten polymer is forced into contact with surface modulations which form two substantially matching gratings. An alignment portion is located so that light which has interacted with both gratings is observable when the substantially transparent polymer is between the surfaces. While the polymer is still liquid, the molding component is reconfigured from a current configuration to a new configuration in which the fringe spacing of a fringe pattern formed by the two gratings is substantially maximal, thus aligning the gratings to have a substantially zero relative orientation angle. The new configuration is maintained while the polymer sets.

20 Claims, 7 Drawing Sheets

Side view

(56) References Cited

U.S. PATENT DOCUMENTS

| | | |
|---|---|---|
| 4,711,512 A | 12/1987 | Upatnieks |
| 4,758,087 A | 7/1988 | Hicks, Jr. |
| 4,799,752 A | 1/1989 | Carome |
| 4,822,145 A | 4/1989 | Staelin |
| 4,860,361 A | 8/1989 | Sato et al. |
| 4,900,129 A | 2/1990 | Vanderwerf |
| 4,957,351 A | 9/1990 | Shioji |
| 5,004,673 A | 4/1991 | Vlannes |
| 5,019,808 A | 5/1991 | Prince et al. |
| 5,019,898 A | 5/1991 | Chao et al. |
| 5,106,181 A | 4/1992 | Rockwell, III |
| 5,114,236 A | 5/1992 | Matsugu et al. |
| 5,146,355 A | 9/1992 | Prince et al. |
| 5,162,656 A | 11/1992 | Matsugu et al. |
| 5,309,169 A | 5/1994 | Lippert |
| 5,313,535 A | 5/1994 | Williams |
| 5,359,444 A | 10/1994 | Piosenka et al. |
| 5,413,884 A | 5/1995 | Koch et al. |
| 5,453,877 A | 9/1995 | Gerbe et al. |
| 5,455,458 A | 10/1995 | Quon et al. |
| 5,459,611 A | 10/1995 | Bohn et al. |
| 5,483,307 A | 1/1996 | Anderson |
| 5,543,588 A | 8/1996 | Bisset et al. |
| 5,549,212 A | 8/1996 | Kanoh et al. |
| 5,574,473 A | 11/1996 | Sekiguchi |
| 5,579,830 A | 12/1996 | Giammaruti |
| 5,583,609 A | 12/1996 | Mizutani et al. |
| 5,606,455 A | 2/1997 | Eichenlaub |
| 5,614,941 A | 3/1997 | Hines |
| 5,630,902 A * | 5/1997 | Galarneau ............... B29C 33/38 156/379.6 |
| 5,648,643 A | 7/1997 | Knowles et al. |
| 5,651,414 A | 7/1997 | Suzuki et al. |
| 5,673,146 A | 9/1997 | Kelly |
| 5,708,449 A | 1/1998 | Heacock et al. |
| 5,712,995 A | 1/1998 | Cohn |
| 5,714,967 A | 2/1998 | Okamura et al. |
| 5,737,171 A | 4/1998 | Buller et al. |
| 5,751,476 A | 5/1998 | Matsui et al. |
| 5,771,042 A | 6/1998 | Santos-Gomez |
| 5,771,320 A | 6/1998 | Stone |
| 5,772,903 A | 6/1998 | Hirsch |
| 5,856,842 A | 1/1999 | Tedesco |
| 5,861,931 A | 1/1999 | Gillian et al. |
| 5,880,725 A | 3/1999 | Southgate |
| 5,886,822 A | 3/1999 | Spitzer |
| 5,940,149 A | 8/1999 | Vanderwerf |
| 5,959,664 A | 9/1999 | Woodgate |
| 5,982,553 A | 11/1999 | Bloom et al. |
| 5,991,087 A | 11/1999 | Rallison |
| 6,101,008 A | 8/2000 | Popovich |
| 6,144,439 A | 11/2000 | Carollo |
| 6,160,667 A | 12/2000 | Smoot |
| 6,169,829 B1 | 1/2001 | Laming et al. |
| 6,181,852 B1 | 1/2001 | Adams et al. |
| 6,226,178 B1 | 5/2001 | Broder et al. |
| 6,239,502 B1 | 5/2001 | Grewe et al. |
| 6,271,808 B1 | 8/2001 | Corbin |
| 6,307,142 B1 | 10/2001 | Allen et al. |
| 6,323,949 B1 | 11/2001 | Lading et al. |
| 6,323,970 B1 | 11/2001 | Popovich |
| 6,377,401 B1 | 4/2002 | Bartlett |
| 6,411,512 B1 | 6/2002 | Mankaruse et al. |
| 6,417,892 B1 | 7/2002 | Sharp et al. |
| 6,446,442 B1 | 9/2002 | Batchelor et al. |
| 6,466,198 B1 | 10/2002 | Feinstein |
| 6,470,289 B1 | 10/2002 | Peters et al. |
| 6,481,851 B1 | 11/2002 | McNelley et al. |
| 6,483,580 B1 | 11/2002 | Xu et al. |
| 6,496,218 B2 | 12/2002 | Takigawa et al. |
| 6,529,331 B2 | 3/2003 | Massof et al. |
| 6,542,307 B2 | 4/2003 | Gleckman et al. |
| 6,545,650 B1 | 4/2003 | Yamada et al. |
| 6,553,165 B1 | 4/2003 | Temkin et al. |
| 6,554,428 B2 | 4/2003 | Fergason et al. |
| 6,577,411 B1 | 6/2003 | David |
| 6,580,529 B1 | 6/2003 | Amitai et al. |
| 6,606,152 B2 | 8/2003 | Littau et al. |
| 6,621,702 B2 | 9/2003 | Elias et al. |
| 6,631,755 B1 | 10/2003 | Kung et al. |
| 6,635,999 B2 | 10/2003 | Belliveau |
| 6,639,201 B2 | 10/2003 | Almogy et al. |
| 6,661,436 B2 | 12/2003 | Barksdale et al. |
| 6,735,499 B2 | 5/2004 | Ohki et al. |
| 6,753,828 B2 | 6/2004 | Tuceryan et al. |
| 6,775,460 B2 | 8/2004 | Steiner et al. |
| 6,792,328 B2 | 9/2004 | Laughery et al. |
| 6,804,115 B2 | 10/2004 | Lai |
| 6,809,925 B2 | 10/2004 | Belady et al. |
| 6,819,426 B2 | 11/2004 | Sezginer et al. |
| 6,825,987 B2 | 11/2004 | Repetto et al. |
| 6,829,095 B2 | 12/2004 | Amitai |
| 6,867,753 B2 | 3/2005 | Chinthammit et al. |
| 6,888,613 B2 | 5/2005 | Robins et al. |
| 6,889,755 B2 | 5/2005 | Zuo et al. |
| 6,906,901 B1 | 6/2005 | Liu |
| 6,916,584 B2 | 7/2005 | Sreenivasan et al. |
| 6,919,867 B2 | 7/2005 | Sauer |
| 6,947,020 B2 | 9/2005 | Kiser et al. |
| 6,964,731 B1 | 11/2005 | Krisko et al. |
| 6,971,443 B2 | 12/2005 | Kung et al. |
| 6,992,738 B2 | 1/2006 | Ishihara et al. |
| 6,997,241 B2 | 2/2006 | Chou et al. |
| 7,006,215 B2 | 2/2006 | Hoff et al. |
| 7,015,876 B1 | 3/2006 | Miller |
| 7,031,894 B2 | 4/2006 | Niu et al. |
| 7,048,385 B2 | 5/2006 | Beeson et al. |
| 7,061,624 B2 | 6/2006 | Ishizuka |
| 7,069,975 B1 | 7/2006 | Haws et al. |
| 7,099,005 B1 | 8/2006 | Fabrikant et al. |
| 7,113,605 B2 | 9/2006 | Rui et al. |
| 7,116,555 B2 | 10/2006 | Kamath et al. |
| 7,151,635 B2 | 12/2006 | Bidnyk et al. |
| 7,181,699 B2 | 2/2007 | Morrow et al. |
| 7,184,615 B2 | 2/2007 | Levola |
| 7,189,362 B2 | 3/2007 | Nordin et al. |
| 7,191,820 B2 | 3/2007 | Chou et al. |
| 7,193,584 B2 | 3/2007 | Lee et al. |
| 7,196,758 B2 | 3/2007 | Crawford et al. |
| 7,206,107 B2 | 4/2007 | Levola |
| 7,212,709 B2 | 5/2007 | Hosoi |
| 7,212,723 B2 | 5/2007 | McLeod et al. |
| 7,250,930 B2 | 7/2007 | Hoffman et al. |
| 7,261,453 B2 | 8/2007 | Morejon et al. |
| 7,261,827 B2 | 8/2007 | Ootsu et al. |
| 7,271,795 B2 | 9/2007 | Bradski |
| 7,277,282 B2 | 10/2007 | Tate |
| 7,301,587 B2 | 11/2007 | Uehara et al. |
| 7,333,690 B1 | 2/2008 | Peale et al. |
| 7,337,018 B2 | 2/2008 | Espinoza-Ibarra et al. |
| 7,359,420 B2 | 4/2008 | Shchegrov et al. |
| 7,365,734 B2 | 4/2008 | Fateh et al. |
| 7,369,101 B2 | 5/2008 | Sauer et al. |
| 7,372,565 B1 | 5/2008 | Holden et al. |
| 7,376,852 B2 | 5/2008 | Edwards |
| 7,396,133 B2 | 7/2008 | Burnett et al. |
| 7,412,306 B2 | 8/2008 | Katoh et al. |
| 7,416,017 B2 | 8/2008 | Haws et al. |
| 7,417,617 B2 | 8/2008 | Eichenlaub |
| 7,418,170 B2 | 8/2008 | Mukawa et al. |
| 7,428,001 B2 | 9/2008 | Schowengerdt et al. |
| 7,430,349 B2 | 9/2008 | Jones |
| 7,430,355 B2 | 9/2008 | Heikenfeld et al. |
| 7,437,678 B2 | 10/2008 | Awada et al. |
| 7,455,102 B2 | 11/2008 | Cheng |
| 7,505,269 B1 | 3/2009 | Cosley et al. |
| 7,513,627 B2 | 4/2009 | Larson et al. |
| 7,515,143 B2 | 4/2009 | Keam et al. |
| 7,532,227 B2 | 5/2009 | Nakajima et al. |
| 7,542,665 B2 | 6/2009 | Lei |
| 7,551,814 B1 | 6/2009 | Smits |
| 7,576,916 B2 | 8/2009 | Amitai |
| 7,583,327 B2 | 9/2009 | Takatani |
| 7,607,111 B2 | 10/2009 | Vaananen et al. |

(56) References Cited

U.S. PATENT DOCUMENTS

| | | |
|---|---|---|
| 7,612,882 B2 | 11/2009 | Wu et al. |
| 7,619,895 B1 | 11/2009 | Wertz et al. |
| 7,631,687 B2 | 12/2009 | Yang |
| 7,646,606 B2 | 1/2010 | Rytka et al. |
| 7,649,594 B2 | 1/2010 | Kim et al. |
| 7,656,912 B2 | 2/2010 | Brueck et al. |
| 7,660,500 B2 | 2/2010 | Konttinen et al. |
| 7,679,641 B2 | 3/2010 | Lipton et al. |
| 7,693,292 B1 | 4/2010 | Gross et al. |
| 7,701,716 B2 | 4/2010 | Blanco, Jr. et al. |
| 7,706,785 B2 | 4/2010 | Lei et al. |
| 7,716,003 B1 | 5/2010 | Wack et al. |
| 7,719,769 B2 | 5/2010 | Sugihara et al. |
| 7,728,933 B2 | 6/2010 | Kim et al. |
| 7,764,413 B2 | 7/2010 | Levola |
| 7,768,534 B2 | 8/2010 | Pentenrieder et al. |
| 7,777,944 B2 | 8/2010 | Ho et al. |
| 7,788,474 B2 | 8/2010 | Switzer et al. |
| 7,817,104 B2 | 10/2010 | Ryu et al. |
| 7,826,508 B2 | 11/2010 | Reid et al. |
| 7,832,885 B2 | 11/2010 | Hsiao et al. |
| 7,843,691 B2 | 11/2010 | Reichert et al. |
| 7,871,811 B2 | 1/2011 | Fang et al. |
| 7,890,882 B1 | 2/2011 | Nelson |
| 7,894,613 B1 | 2/2011 | Ong et al. |
| 7,903,409 B2 | 3/2011 | Patel et al. |
| 7,904,832 B2 | 3/2011 | Ubillos |
| 7,909,958 B2 | 3/2011 | Washburn et al. |
| 7,941,231 B1 | 5/2011 | Dunn |
| 7,949,214 B2 | 5/2011 | DeJong |
| 7,986,462 B2 | 7/2011 | Kobayashi et al. |
| 8,004,621 B2 | 8/2011 | Woodgate et al. |
| 8,014,644 B2 | 9/2011 | Morimoto et al. |
| 8,033,709 B2 | 10/2011 | Kao et al. |
| 8,046,616 B2 | 10/2011 | Edwards |
| 8,061,411 B2 | 11/2011 | Xu et al. |
| 8,085,948 B2 | 12/2011 | Thomas et al. |
| 8,092,064 B2 | 1/2012 | Erchak et al. |
| 8,125,579 B2 | 2/2012 | Khan et al. |
| 8,128,800 B2 | 3/2012 | Seo et al. |
| 8,139,504 B2 | 3/2012 | Mankins et al. |
| 8,150,893 B2 | 4/2012 | Bohannon et al. |
| 8,160,411 B2 | 4/2012 | Levola et al. |
| 8,162,524 B2 | 4/2012 | Van Ostrand et al. |
| 8,165,988 B2 | 4/2012 | Shau et al. |
| 8,176,436 B2 | 5/2012 | Arend et al. |
| 8,189,263 B1 | 5/2012 | Wang et al. |
| 8,195,220 B2 | 6/2012 | Kim et al. |
| 8,233,204 B1 | 7/2012 | Robbins et al. |
| 8,233,273 B2 | 7/2012 | Chen et al. |
| 8,244,667 B1 | 8/2012 | Weinberger et al. |
| 8,246,170 B2 | 8/2012 | Yamamoto et al. |
| 8,274,614 B2 | 9/2012 | Yokote et al. |
| 8,300,614 B2 | 10/2012 | Ankaiah et al. |
| 8,320,032 B2 | 11/2012 | Levola |
| 8,332,402 B2 | 12/2012 | Forstall et al. |
| 8,358,400 B2 | 1/2013 | Escuti |
| 8,384,999 B1 | 2/2013 | Crosby et al. |
| 8,392,035 B2 | 3/2013 | Patel et al. |
| 8,395,898 B1 | 3/2013 | Chamseddine et al. |
| 8,418,083 B1 | 4/2013 | Lundy et al. |
| 8,434,019 B2 | 4/2013 | Nelson |
| 8,446,340 B2 | 5/2013 | Aharoni |
| 8,466,953 B2 | 6/2013 | Levola |
| 8,472,119 B1 | 6/2013 | Kelly |
| 8,482,920 B2 | 7/2013 | Tissot et al. |
| 8,571,539 B1 | 10/2013 | Ranganathan et al. |
| 8,576,143 B1 | 11/2013 | Kelly |
| 8,589,341 B2 | 11/2013 | Golde et al. |
| 8,593,734 B2 | 11/2013 | Laakkonen |
| 8,594,702 B2 | 11/2013 | Naaman et al. |
| 8,605,700 B2 | 12/2013 | Gurin |
| 8,611,014 B2 | 12/2013 | Valera et al. |
| 8,627,228 B2 | 1/2014 | Yosef et al. |
| 8,629,815 B2 | 1/2014 | Brin et al. |
| 8,634,139 B1 | 1/2014 | Brown et al. |
| 8,638,498 B2 | 1/2014 | Bohn et al. |
| 8,645,871 B2 | 2/2014 | Fong et al. |
| 8,666,212 B1 | 3/2014 | Amirparviz |
| 8,693,500 B2 | 4/2014 | Ludwig et al. |
| 8,698,845 B2 | 4/2014 | Lemay |
| 8,700,931 B2 | 4/2014 | Gudlavenkatasiva et al. |
| 8,712,598 B2 | 4/2014 | Dighde et al. |
| 8,717,676 B2 | 5/2014 | Rinko |
| 8,754,831 B2 | 6/2014 | Kollin et al. |
| 8,810,600 B2 | 8/2014 | Bohn et al. |
| 8,817,350 B1 | 8/2014 | Robbins et al. |
| 8,823,531 B1 | 9/2014 | McCleary et al. |
| 8,885,997 B2 | 11/2014 | Nguyen et al. |
| 8,909,384 B1 | 12/2014 | Beitelmal et al. |
| 8,917,453 B2 | 12/2014 | Bohn |
| 8,934,235 B2 | 1/2015 | Rubenstein et al. |
| 8,941,683 B2 | 1/2015 | Son et al. |
| 8,989,535 B2 | 3/2015 | Robbins |
| 9,304,235 B2 | 4/2016 | Sainiemi et al. |
| 9,372,347 B1 | 6/2016 | Levola et al. |
| 2001/0043208 A1 | 11/2001 | Furness, III et al. |
| 2002/0035455 A1 | 3/2002 | Niu et al. |
| 2002/0038196 A1 | 3/2002 | Johnson et al. |
| 2002/0041735 A1 | 4/2002 | Cai et al. |
| 2002/0044152 A1 | 4/2002 | Abbott et al. |
| 2002/0044162 A1 | 4/2002 | Sawatari |
| 2002/0063820 A1 | 5/2002 | Broer et al. |
| 2002/0097558 A1 | 7/2002 | Stone et al. |
| 2002/0138772 A1 | 9/2002 | Crawford et al. |
| 2002/0171939 A1 | 11/2002 | Song |
| 2002/0180659 A1 | 12/2002 | Takahashi |
| 2003/0006364 A1 | 1/2003 | Katzir et al. |
| 2003/0023889 A1 | 1/2003 | Hofstee et al. |
| 2003/0137706 A1 | 7/2003 | Rmanujam et al. |
| 2003/0179453 A1 | 9/2003 | Mori et al. |
| 2003/0214728 A1 | 11/2003 | Olczak |
| 2004/0011503 A1 | 1/2004 | Kung et al. |
| 2004/0042724 A1 | 3/2004 | Gombert et al. |
| 2004/0085649 A1 | 5/2004 | Repetto et al. |
| 2004/0108971 A1 | 6/2004 | Waldern et al. |
| 2004/0109234 A1 | 6/2004 | Levola |
| 2004/0135209 A1 | 7/2004 | Hsieh et al. |
| 2004/0151466 A1 | 8/2004 | Crossman-Bosworth et al. |
| 2004/0176928 A1 | 9/2004 | Johnson |
| 2004/0267990 A1 | 12/2004 | Lin |
| 2005/0100272 A1 | 5/2005 | Gilman |
| 2005/0174737 A1 | 8/2005 | Meir |
| 2005/0207120 A1 | 9/2005 | Tseng et al. |
| 2005/0243107 A1 | 11/2005 | Haim et al. |
| 2005/0248705 A1 | 11/2005 | Smith et al. |
| 2005/0285878 A1 | 12/2005 | Singh et al. |
| 2006/0018025 A1 | 1/2006 | Sharon et al. |
| 2006/0032616 A1 | 2/2006 | Yang |
| 2006/0038881 A1 | 2/2006 | Starkweather et al. |
| 2006/0054787 A1 | 3/2006 | Olsen et al. |
| 2006/0072206 A1 | 4/2006 | Tsuyuki et al. |
| 2006/0118280 A1 | 6/2006 | Liu |
| 2006/0126181 A1 | 6/2006 | Levola |
| 2006/0129951 A1 | 6/2006 | Vaananen et al. |
| 2006/0132806 A1 | 6/2006 | Shchegrov et al. |
| 2006/0132914 A1 | 6/2006 | Weiss et al. |
| 2006/0139447 A1 | 6/2006 | Unkrich |
| 2006/0152646 A1 | 7/2006 | Schrader |
| 2006/0164382 A1 | 7/2006 | Kulas et al. |
| 2006/0183331 A1 | 8/2006 | Hofmann |
| 2006/0196643 A1 | 9/2006 | Hata et al. |
| 2006/0221448 A1 | 10/2006 | Nivon et al. |
| 2006/0228073 A1 | 10/2006 | Mukawa et al. |
| 2006/0249765 A1 | 11/2006 | Hsieh |
| 2006/0250541 A1 | 11/2006 | Huck |
| 2007/0002412 A1 | 1/2007 | Aihara |
| 2007/0008456 A1 | 1/2007 | Lesage et al. |
| 2007/0023703 A1 | 2/2007 | Sunaoshi et al. |
| 2007/0027591 A1 | 2/2007 | Goldenberg et al. |
| 2007/0041684 A1 | 2/2007 | Popovich et al. |
| 2007/0097019 A1 | 5/2007 | Wynne-Powell et al. |
| 2007/0147673 A1 | 6/2007 | Crandall |
| 2007/0153395 A1 | 7/2007 | Repetto et al. |

(56) References Cited

U.S. PATENT DOCUMENTS

| | | |
|---|---|---|
| 2007/0171328 A1 | 7/2007 | Freeman et al. |
| 2007/0177260 A1 | 8/2007 | Kuppenheimer et al. |
| 2007/0214180 A1 | 9/2007 | Crawford |
| 2007/0236959 A1 | 10/2007 | Tolbert et al. |
| 2007/0284093 A1 | 12/2007 | Bhatti et al. |
| 2008/0008076 A1 | 1/2008 | Raguin et al. |
| 2008/0014534 A1 | 1/2008 | Barwicz et al. |
| 2008/0025350 A1 | 1/2008 | Arbore et al. |
| 2008/0043100 A1 | 2/2008 | Sobel et al. |
| 2008/0043425 A1 | 2/2008 | Hebert et al. |
| 2008/0088603 A1 | 4/2008 | Eliasson et al. |
| 2008/0088624 A1 | 4/2008 | Long et al. |
| 2008/0106677 A1 | 5/2008 | Kuan et al. |
| 2008/0117341 A1 | 5/2008 | McGrew |
| 2008/0141681 A1 | 6/2008 | Arnold |
| 2008/0150913 A1 | 6/2008 | Bell et al. |
| 2008/0174735 A1 | 7/2008 | Quach et al. |
| 2008/0232680 A1 | 9/2008 | Berestov et al. |
| 2008/0248852 A1 | 10/2008 | Rasmussen |
| 2008/0285140 A1 | 11/2008 | Amitai |
| 2008/0297535 A1 | 12/2008 | Reinig |
| 2008/0303918 A1 | 12/2008 | Keithley |
| 2008/0311386 A1 | 12/2008 | Wendt |
| 2009/0002939 A1 | 1/2009 | Baugh et al. |
| 2009/0015742 A1 | 1/2009 | Liao et al. |
| 2009/0021908 A1 | 1/2009 | Patel et al. |
| 2009/0051283 A1 | 2/2009 | Cok et al. |
| 2009/0059376 A1* | 3/2009 | Hayakawa ......... B29D 11/0073 359/576 |
| 2009/0084525 A1 | 4/2009 | Satou et al. |
| 2009/0092261 A1 | 4/2009 | Bard |
| 2009/0097127 A1 | 4/2009 | Amitai |
| 2009/0128449 A1 | 5/2009 | Brown et al. |
| 2009/0128901 A1 | 5/2009 | Tilleman et al. |
| 2009/0180250 A1 | 7/2009 | Holling et al. |
| 2009/0189974 A1 | 7/2009 | Deering |
| 2009/0190003 A1 | 7/2009 | Park et al. |
| 2009/0195756 A1 | 8/2009 | Li et al. |
| 2009/0199128 A1 | 8/2009 | Matthews et al. |
| 2009/0222147 A1 | 9/2009 | Nakashima et al. |
| 2009/0224416 A1 | 9/2009 | Laakkonen et al. |
| 2009/0235203 A1 | 9/2009 | Iizuka |
| 2009/0244413 A1 | 10/2009 | Ishikawa et al. |
| 2009/0246707 A1 | 10/2009 | Li et al. |
| 2009/0256837 A1 | 10/2009 | Deb et al. |
| 2009/0262419 A1 | 10/2009 | Robinson et al. |
| 2009/0303599 A1 | 12/2009 | Levola |
| 2010/0002989 A1 | 1/2010 | Tokushima |
| 2010/0021108 A1 | 1/2010 | Kang et al. |
| 2010/0053151 A1 | 3/2010 | Marti et al. |
| 2010/0060551 A1 | 3/2010 | Sugiyama et al. |
| 2010/0061078 A1 | 3/2010 | Kim |
| 2010/0074291 A1 | 3/2010 | Nakamura |
| 2010/0079865 A1 | 4/2010 | Saarikko et al. |
| 2010/0084674 A1 | 4/2010 | Paetzold et al. |
| 2010/0096617 A1 | 4/2010 | Shanks |
| 2010/0103078 A1 | 4/2010 | Mukawa et al. |
| 2010/0134534 A1 | 6/2010 | Seesselberg et al. |
| 2010/0141905 A1 | 6/2010 | Burke |
| 2010/0149073 A1 | 6/2010 | Chaum et al. |
| 2010/0188353 A1 | 7/2010 | Yoon et al. |
| 2010/0200736 A1 | 8/2010 | Laycock et al. |
| 2010/0201953 A1 | 8/2010 | Freeman et al. |
| 2010/0202725 A1 | 8/2010 | Popovich et al. |
| 2010/0211575 A1 | 8/2010 | Collins et al. |
| 2010/0213467 A1 | 8/2010 | Lee et al. |
| 2010/0220439 A1 | 9/2010 | Qin |
| 2010/0229853 A1 | 9/2010 | Vandal et al. |
| 2010/0238270 A1 | 9/2010 | Bjelkhagen et al. |
| 2010/0245387 A1 | 9/2010 | Bachelder et al. |
| 2010/0259889 A1 | 10/2010 | Chen et al. |
| 2010/0271467 A1 | 10/2010 | Akeley |
| 2010/0277421 A1 | 11/2010 | Charlier et al. |
| 2010/0277439 A1 | 11/2010 | Charlier et al. |
| 2010/0277779 A1 | 11/2010 | Futterer et al. |
| 2010/0277803 A1 | 11/2010 | Pockett et al. |
| 2010/0284085 A1 | 11/2010 | Laakkonen |
| 2010/0300654 A1 | 12/2010 | Edwards |
| 2010/0309687 A1 | 12/2010 | Sampsell et al. |
| 2010/0315781 A1 | 12/2010 | Agostini |
| 2010/0317132 A1 | 12/2010 | Rogers et al. |
| 2010/0321609 A1 | 12/2010 | Qi et al. |
| 2010/0321781 A1 | 12/2010 | Levola |
| 2010/0328351 A1 | 12/2010 | Tan |
| 2011/0012814 A1 | 1/2011 | Tanaka |
| 2011/0021251 A1 | 1/2011 | Lind én |
| 2011/0025605 A1 | 2/2011 | Kwitek |
| 2011/0026128 A1 | 2/2011 | Baker et al. |
| 2011/0032482 A1 | 2/2011 | Agurok |
| 2011/0038049 A1 | 2/2011 | Vallius et al. |
| 2011/0050547 A1 | 3/2011 | Mukawa |
| 2011/0050655 A1 | 3/2011 | Mukawa |
| 2011/0051660 A1 | 3/2011 | Popovich et al. |
| 2011/0063795 A1 | 3/2011 | Yeh et al. |
| 2011/0075442 A1 | 3/2011 | Chiang |
| 2011/0084893 A1 | 4/2011 | Lee et al. |
| 2011/0090343 A1 | 4/2011 | Alt et al. |
| 2011/0091156 A1 | 4/2011 | Laughlin |
| 2011/0096401 A1 | 4/2011 | Levola |
| 2011/0099512 A1 | 4/2011 | Jeong |
| 2011/0114823 A1 | 5/2011 | Katzir et al. |
| 2011/0115340 A1 | 5/2011 | Lee |
| 2011/0127024 A1 | 6/2011 | Patel et al. |
| 2011/0134017 A1 | 6/2011 | Burke |
| 2011/0134645 A1 | 6/2011 | Hitchcock et al. |
| 2011/0141388 A1 | 6/2011 | Park et al. |
| 2011/0148931 A1 | 6/2011 | Kim |
| 2011/0163986 A1 | 7/2011 | Lee et al. |
| 2011/0175930 A1 | 7/2011 | Hwang et al. |
| 2011/0194029 A1 | 8/2011 | Herrmann et al. |
| 2011/0205251 A1 | 8/2011 | Auld |
| 2011/0210946 A1 | 9/2011 | Goertz et al. |
| 2011/0214082 A1 | 9/2011 | Osterhout et al. |
| 2011/0215349 A1 | 9/2011 | An et al. |
| 2011/0221658 A1 | 9/2011 | Haddick et al. |
| 2011/0221659 A1 | 9/2011 | King, Iii et al. |
| 2011/0222236 A1 | 9/2011 | Luo et al. |
| 2011/0227820 A1 | 9/2011 | Haddick et al. |
| 2011/0227913 A1 | 9/2011 | Hyndman |
| 2011/0235179 A1 | 9/2011 | Simmonds |
| 2011/0242145 A1 | 10/2011 | Nishimura et al. |
| 2011/0242392 A1 | 10/2011 | Chiang |
| 2011/0242757 A1 | 10/2011 | Tracy et al. |
| 2011/0248904 A1 | 10/2011 | Miyawaki et al. |
| 2011/0248958 A1 | 10/2011 | Gruhlke et al. |
| 2011/0267799 A1 | 11/2011 | Epstein et al. |
| 2011/0283223 A1 | 11/2011 | Vaittinen et al. |
| 2011/0295913 A1 | 12/2011 | Enbutsu |
| 2011/0299044 A1 | 12/2011 | Yeh et al. |
| 2011/0304640 A1 | 12/2011 | Noge |
| 2011/0309378 A1 | 12/2011 | Lau et al. |
| 2011/0310232 A1 | 12/2011 | Wilson et al. |
| 2011/0310312 A1 | 12/2011 | Yokote et al. |
| 2012/0013651 A1 | 1/2012 | Trayner et al. |
| 2012/0019434 A1 | 1/2012 | Kuhlman et al. |
| 2012/0026161 A1 | 2/2012 | Chen et al. |
| 2012/0030616 A1 | 2/2012 | Howes et al. |
| 2012/0033306 A1 | 2/2012 | Valera et al. |
| 2012/0038629 A1 | 2/2012 | Brown et al. |
| 2012/0041721 A1 | 2/2012 | Chen |
| 2012/0044573 A1 | 2/2012 | Simmonds et al. |
| 2012/0050144 A1 | 3/2012 | Morlock |
| 2012/0052934 A1 | 3/2012 | Maharbiz et al. |
| 2012/0062998 A1 | 3/2012 | Schultz et al. |
| 2012/0069413 A1 | 3/2012 | Schultz |
| 2012/0084710 A1 | 4/2012 | Sirpal et al. |
| 2012/0106170 A1 | 5/2012 | Matthews et al. |
| 2012/0111544 A1 | 5/2012 | Senatori |
| 2012/0113092 A1 | 5/2012 | Bar-Zeev et al. |
| 2012/0120493 A1 | 5/2012 | Simmonds et al. |
| 2012/0134623 A1 | 5/2012 | Boudreau et al. |
| 2012/0144331 A1 | 6/2012 | Tolonen et al. |
| 2012/0157114 A1 | 6/2012 | Alameh et al. |
| 2012/0162764 A1 | 6/2012 | Shimizu |

(56) References Cited

U.S. PATENT DOCUMENTS

| | | |
|---|---|---|
| 2012/0176322 A1 | 7/2012 | Karmi et al. |
| 2012/0176474 A1 | 7/2012 | Border |
| 2012/0182687 A1 | 7/2012 | Dighde et al. |
| 2012/0188205 A1 | 7/2012 | Jansson et al. |
| 2012/0195553 A1 | 8/2012 | Hasegawa et al. |
| 2012/0200495 A1 | 8/2012 | Johansson |
| 2012/0206589 A1 | 8/2012 | Crandall |
| 2012/0206880 A1 | 8/2012 | Andres et al. |
| 2012/0218301 A1 | 8/2012 | Miller |
| 2012/0227006 A1 | 9/2012 | Amm |
| 2012/0235885 A1 | 9/2012 | Miller et al. |
| 2012/0242561 A1 | 9/2012 | Sugihara |
| 2012/0256856 A1 | 10/2012 | Suzuki et al. |
| 2012/0256963 A1 | 10/2012 | Suzuki et al. |
| 2012/0262657 A1 | 10/2012 | Nakanishi et al. |
| 2012/0287381 A1 | 11/2012 | Li et al. |
| 2012/0292535 A1 | 11/2012 | Choi et al. |
| 2012/0304092 A1 | 11/2012 | Jarrett et al. |
| 2012/0304108 A1 | 11/2012 | Jarrett et al. |
| 2013/0000871 A1 | 1/2013 | Olson et al. |
| 2013/0033485 A1 | 2/2013 | Kollin et al. |
| 2013/0081779 A1 | 4/2013 | Liao et al. |
| 2013/0093741 A1 | 4/2013 | Akimoto et al. |
| 2013/0106674 A1 | 5/2013 | Wheeler et al. |
| 2013/0148864 A1 | 6/2013 | Dolson et al. |
| 2013/0162673 A1 | 6/2013 | Bohn |
| 2013/0163089 A1 | 6/2013 | Bohn |
| 2013/0170031 A1 | 7/2013 | Bohn |
| 2013/0170802 A1 | 7/2013 | Pitwon |
| 2013/0186596 A1 | 7/2013 | Rubenstein |
| 2013/0186598 A1 | 7/2013 | Rubenstein |
| 2013/0187943 A1 | 7/2013 | Bohn et al. |
| 2013/0198176 A1 | 8/2013 | Kim |
| 2013/0207964 A1 | 8/2013 | Fleck |
| 2013/0208003 A1 | 8/2013 | Bohn |
| 2013/0208362 A1 | 8/2013 | Bohn |
| 2013/0208482 A1 | 8/2013 | Fleck |
| 2013/0215081 A1 | 8/2013 | Levin et al. |
| 2013/0226931 A1 | 8/2013 | Hazel et al. |
| 2013/0242056 A1 | 9/2013 | Fleck |
| 2013/0242555 A1 | 9/2013 | Mukawa |
| 2013/0250431 A1 | 9/2013 | Robbins et al. |
| 2013/0252628 A1 | 9/2013 | Kuehnel |
| 2013/0254412 A1 | 9/2013 | Menezes et al. |
| 2013/0257848 A1 | 10/2013 | Westerinen et al. |
| 2013/0258701 A1 | 10/2013 | Westerinen et al. |
| 2013/0267309 A1 | 10/2013 | Robbins |
| 2013/0294030 A1 | 11/2013 | Wang et al. |
| 2013/0305184 A1 | 11/2013 | Kim et al. |
| 2013/0307875 A1 | 11/2013 | Anderson |
| 2013/0314789 A1 | 11/2013 | Saarikko et al. |
| 2013/0314793 A1 | 11/2013 | Robbins |
| 2013/0322810 A1 | 12/2013 | Robbins |
| 2013/0332159 A1 | 12/2013 | Federighi et al. |
| 2013/0335671 A1 | 12/2013 | Fleck |
| 2013/0339446 A1 | 12/2013 | Balassanian et al. |
| 2013/0342674 A1 | 12/2013 | Dixon |
| 2013/0346725 A1 | 12/2013 | Lomet et al. |
| 2014/0010265 A1 | 1/2014 | Peng |
| 2014/0022265 A1 | 1/2014 | Canan et al. |
| 2014/0041827 A1 | 2/2014 | Giaimo |
| 2014/0059139 A1 | 2/2014 | Filev et al. |
| 2014/0063367 A1 | 3/2014 | Yang et al. |
| 2014/0078130 A1 | 3/2014 | Uchino et al. |
| 2014/0089833 A1 | 3/2014 | Hwang et al. |
| 2014/0094973 A1 | 4/2014 | Giaimo et al. |
| 2014/0098671 A1 | 4/2014 | Raleigh et al. |
| 2014/0104665 A1 | 4/2014 | Popovich et al. |
| 2014/0104685 A1 | 4/2014 | Bohn |
| 2014/0111865 A1 | 4/2014 | Kobayashi |
| 2014/0116982 A1 | 5/2014 | Schellenberg et al. |
| 2014/0140653 A1 | 5/2014 | Brown et al. |
| 2014/0140654 A1 | 5/2014 | Brown et al. |
| 2014/0143247 A1 | 5/2014 | Rathnavelu et al. |
| 2014/0143351 A1 | 5/2014 | Deng |
| 2014/0176528 A1 | 6/2014 | Robbins |
| 2014/0184699 A1 | 7/2014 | Ito et al. |
| 2014/0204455 A1 | 7/2014 | Popovich et al. |
| 2014/0240842 A1 | 8/2014 | Nguyen et al. |
| 2014/0300966 A1 | 10/2014 | Travers et al. |
| 2014/0314374 A1 | 10/2014 | Fattal et al. |
| 2015/0086163 A1 | 3/2015 | Valera et al. |
| 2015/0168731 A1 | 6/2015 | Robbins |
| 2016/0033697 A1 | 2/2016 | Sainiema et al. |
| 2016/0033784 A1 | 2/2016 | Levola et al. |
| 2016/0035539 A1 | 2/2016 | Sainiema et al. |

FOREIGN PATENT DOCUMENTS

| | | |
|---|---|---|
| CN | 101105512 | 1/2008 |
| CN | 102004315 | 4/2011 |
| EP | 0977022 | 2/2000 |
| EP | 1494109 | 1/2005 |
| EP | 1847924 | 10/2007 |
| EP | 2065750 | 6/2009 |
| EP | 2083310 | 7/2009 |
| EP | 2112547 | 10/2009 |
| EP | 2144177 | 1/2010 |
| EP | 2216678 | 1/2010 |
| EP | 2241926 | 10/2010 |
| EP | 2662761 | 11/2013 |
| EP | 2752691 | 7/2014 |
| EP | 2887121 | 6/2015 |
| FR | 2942811 | 9/2010 |
| GB | 2500631 | 10/2013 |
| JP | S57109618 | 7/1982 |
| JP | H0422358 | 1/1992 |
| JP | 7311303 | 11/1995 |
| JP | 2000347037 | 12/2000 |
| JP | 2001078234 | 3/2001 |
| JP | 2008017135 | 1/2008 |
| KR | 20070001771 | 1/2007 |
| KR | 20090076539 | 7/2009 |
| KR | 20090084316 | 8/2009 |
| KR | 20110070087 | 6/2011 |
| KR | 20120023458 | 3/2012 |
| TW | 201407202 | 2/2014 |
| WO | WO-9418595 | 8/1994 |
| WO | WO-9952002 | 10/1999 |
| WO | WO-0133282 | 5/2001 |
| WO | WO-0195027 | 12/2001 |
| WO | WO-03090611 | 11/2003 |
| WO | WO-2006054056 | 5/2006 |
| WO | WO-2006064334 | 6/2006 |
| WO | WO-2007052265 | 5/2007 |
| WO | WO-2007057500 | 5/2007 |
| WO | WO-2008021504 | 2/2008 |
| WO | WO-2008081070 | 7/2008 |
| WO | WO-2009029826 | 3/2009 |
| WO | WO-2009077601 | 6/2009 |
| WO | WO-2009127849 | 10/2009 |
| WO | WO-2010092409 | 8/2010 |
| WO | WO-2010125337 | 11/2010 |
| WO | WO-2011003381 | 1/2011 |
| WO | WO-2011051660 | 5/2011 |
| WO | WO-2011090455 | 7/2011 |
| WO | WO-2011110728 | 9/2011 |
| WO | WO-2011131978 | 10/2011 |
| WO | WO-2012172295 | 12/2012 |
| WO | WO-2012177811 | 12/2012 |
| WO | WO-2013033274 | 3/2013 |
| WO | WO-2013058769 | 4/2013 |
| WO | WO-2013164665 | 11/2013 |
| WO | WO-2014051920 | 4/2014 |
| WO | WO-2014085502 | 6/2014 |
| WO | WO-2014088343 | 6/2014 |
| WO | WO-2014111163 | 7/2014 |
| WO | WO-2014130383 | 8/2014 |

OTHER PUBLICATIONS

"International Search Report and Written Opinion", Application No. PCT/US2015/042187, Oct. 20, 2015, 10 pages.

(56) References Cited

OTHER PUBLICATIONS

"International Search Report and Written Opinion", Application No. PCT/US2015/042226, Oct. 27, 2015, 10 Pages.
"International Search Report and Written Opinion", Application No. PCT/US2015/042205, Oct. 30, 2015, 10 pages.
"International Search Report and Written Opinion", Application No. PCT/US2015/042218, Nov. 6, 2015, 10 pages.
"International Search Report and Written Opinion", Application No. PCT/US2015/042259, Oct. 12, 2015, 11 pages.
"International Search Report and Written Opinion", Application No. PCT/US2015/041930, Oct. 20, 2015, 12 Pages.
"International Search Report and Written Opinion", Application No. PCT/US2015/041900, Oct. 21, 2015, 12 pages.
"International Search Report and Written Opinion", Application No. PCT/US2015/041909, Oct. 20, 2015, 13 pages.
"International Search Report and Written Opinion", Application No. PCT/US2015/041046, Nov. 9, 2015, 15 pages.
"Notice of Allowance", U.S. Appl. No. 14/447,464, Nov. 9, 2015, 10 pages.
"Restriction Requirement", U.S. Appl. No. 14/617,697, Nov. 30, 2015, 6 pages.
Ando,"Development of Three-Dimensional Microstages Using Inclined Deep-Reactive Ion Etching", Journal of Microelectromechanical Systems, Jun. 1, 2007, 10 pages.
Antonopoulos,"Efficient Updates for Web-Scale Indexes over the Cloud", IEEE 28th International Conference on Data Engineering Workshops, Apr. 2012, 8 pages.
Garcia,"COMET: Content Mediator Architecture for Content-Aware Networks", In IEEE Future Network & Mobile Summit, 2011, 8 pages.
Gila,"First Results From A Multi-Ion Beam Lithography And Processing System At The University Of Florida", AIP Conference Proceedings, Jun. 1, 2011, 6 pages.
Levandoski,"Ranking and New Database Architectures", In Proceedings of the 7th International Workshop on Ranking in Databases, Aug. 2013, 4 pages.
"Non-Final Office Action", U.S. Appl. No. 14/447,419, Feb. 2, 2016, 8 pages.
"Non-Final Office Action", U.S. Appl. No. 14/617,574, Feb. 26, 2016, 22 pages.
"Non-Final Office Action", U.S. Appl. No. 14/617,710, Mar. 2, 2016, 16 pages.
"Notice of Allowance", U.S. Appl. No. 14/617,697, Feb. 29, 2016, 7 pages.
"Notice of Allowance", U.S. Appl. No. 14/617,723, Feb. 9, 2016, 10 pages.
"Supplemental Notice of Allowance", U.S. Appl. No. 14/447,464, Jan. 12, 2016, 2 pages.
Glendenning, "Polymer Micro-Optics via Micro Injection Moulding", Available at: https://web.archive.org/web/20120310003606/http://www.microsystems.uk.com/english/polymer_optics_injection_moulding.html, Jan. 10, 2011, 6 pages.
L, et al., "All-Nanoparticle Concave Diffraction Grating Fabricated by Self-Assembly onto Magnetically-Recorded Templates", In Proceedings of Optical Express, vol. 21, Issue 1, Jan. 2013, 1 page.
"Advisory Action", U.S. Appl. No. 13/428,879, Sep. 19, 2014, 3 pages.
"Augmented Reality and Physical Games", U.S. Appl. No. 13/440,165, Apr. 5, 2012, 49 pages.
"Corrected Final Office Action", U.S. Appl. No. 13/432,311, Dec. 24, 2014, 25 pages.
"Corrected Notice of Allowance", U.S. Appl. No. 13/355,836, Sep. 11, 2014, 2 pages.
"Corrected Notice of Allowance", U.S. Appl. No. 13/355,836, Dec. 15, 2014, 2 pages.
"DigiLens", SBG Labs—retrieved from <http://www.digilens.com/products.html> on Jun. 19, 2012, 1 page.
"Final Office Action", U.S. Appl. No. 13/336,873, Jan. 5, 2015, 21 pages.
"Final Office Action", U.S. Appl. No. 13/336,895, May 27, 2014, 11 pages.
"Final Office Action", U.S. Appl. No. 13/355,836, Mar. 10, 2014, 18 pages.
"Final Office Action", U.S. Appl. No. 13/355,914, Feb. 23, 2015, 21 pages.
"Final Office Action", U.S. Appl. No. 13/355,914, Jun. 19, 2014, 11 pages.
"Final Office Action", U.S. Appl. No. 13/397,495, May 29, 2014, 10 pages.
"Final Office Action", U.S. Appl. No. 13/397,516, Jan. 29, 2015, 13 pages.
"Final Office Action", U.S. Appl. No. 13/397,539, Jun. 29, 2015, 11 pages.
"Final Office Action", U.S. Appl. No. 13/428,879, Jul. 14, 2014, 12 pages.
"Final Office Action", U.S. Appl. No. 13/432,311, Dec. 15, 2014, 24 pages.
"Final Office Action", U.S. Appl. No. 13/432,372, Jan. 29, 2015, 33 pages.
"Final Office Action", U.S. Appl. No. 13/440,165, Jun. 6, 2014, 12 pages.
"Final Office Action", U.S. Appl. No. 13/440,165, Jul. 21, 2015, 11 pages.
"Final Office Action", U.S. Appl. No. 13/477,646, Feb. 23, 2015, 36 pages.
"Final Office Action", U.S. Appl. No. 13/477,646, May 5, 2014, 26 pages.
"Final Office Action", U.S. Appl. No. 13/525,649, Oct. 9, 2014, 8 pages.
"Final Office Action", U.S. Appl. No. 13/774,875, Jun. 4, 2015, 10 pages.
"Final Office Action", U.S. Appl. No. 14/134,993, Jul. 16, 2015, 19 pages.
"Final Office Action", U.S. Appl. No. 14/134,993, Aug. 20, 2014, 15 pages.
"Foreign Notice of Allowance", CN Application No. 201320034345.X, Aug. 14, 2013, 2 Pages.
"Foreign Office Action", CN Application No. 201210563730.3, Jan. 7, 2015, 16 pages.
"Foreign Office Action", CN Application No. 201210567932.5, Aug. 14, 2014, 12 pages.
"Foreign Office Action", EP Application No. 13769961.7, Mar. 11, 2015, 8 pages.
"Foreign Office Action", EP Application No. 13769961.7, Jun. 30, 2015, 6 pages.
"HDTV Helmet Mounted Display", Available at <http://defense-update.com/products/h/HDTV-HMD.htm>, Jan. 26, 2005, 1 page.
"International Search Report and Written Opinion", Application No. PCT/US2012/069331, Mar. 29, 2013, 10 pages.
"International Search Report and Written Opinion", Application No. PCT/US2014/016658, Apr. 23, 2014, 10 pages.
"International Search Report and Written Opinion", Application No. PCT/US2013/053676, Oct. 16, 2013, 10 pages.
"International Search Report and Written Opinion", Application No. PCT/US2013/030632, Jun. 26, 2013, 10 pages.
"International Search Report and Written Opinion", Application No. PCT/US2013/028477, Jun. 21, 2013, 11 pages.
"International Search Report and Written Opinion", Application No. PCT/US2013/031111, Jun. 26, 2013, 11 pages.
"International Search Report and Written Opinion", Application No. PCT/US2013/076832, Mar. 17, 2014, 12 pages.
"International Search Report and Written Opinion", Application No. PCT/US2013/061225, Jun. 4, 2014, 12 pages.
"International Search Report and Written Opinion", Application No. PCT/US2012/071563, Apr. 25, 2013, 13 pages.
"International Search Report and Written Opinion", Application No. PCT/US2013/021784, Apr. 30, 2013, 9 pages.
"International Search Report and Written Opinion", Application No. PCT/US2012/069330, Mar. 28, 2013, 9 pages.
"International Search Report and Written Opinion", Application No. PCT/US2013/021783, May 15, 2013, 9 pages.

(56) References Cited

OTHER PUBLICATIONS

"International Search Report and Written Opinion", Application No. PCT/US2013/026200, Jun. 3, 2013, 9 pages.
"Light Guide Techniques using LED Lamps", Application Brief I-003, retrieved from <http://www.ciri.org.nz/downloads/Lightpipe%20design.pdf> on Jan. 12, 2012, Oct. 14, 2008, 22 pages.
"New Technology from MIT may Enable Cheap, Color, Holographic Video Displays", Retrieved from <http://www.gizmag.com/holograph-3d-color-video-display-inexpensive-mit/28029/> on Feb. 25, 2015, Jun. 24, 2013, 8 pages.
"Non-Final Office Action", U.S. Appl. No. 13/397,495, Nov. 13, 2013, 8 pages.
"Non-Final Office Action", U.S. Appl. No. 13/440,165, Feb. 6, 2014, 12 pages.
"Non-Final Office Action", U.S. Appl. No. 13/336,873, Apr. 9, 2015, 18 pages.
"Non-Final Office Action", U.S. Appl. No. 13/336,873, Jul. 25, 2014, 16 pages.
"Non-Final Office Action", U.S. Appl. No. 13/336,895, Oct. 24, 2013, 9 pages.
"Non-Final Office Action", U.S. Appl. No. 13/343,675, Jul. 16, 2013, 9 pages.
"Non-Final Office Action", U.S. Appl. No. 13/355,836, Nov. 4, 2013, 15 pages.
"Non-Final Office Action", U.S. Appl. No. 13/355,914, Feb. 14, 2014, 10 pages.
"Non-Final Office Action", U.S. Appl. No. 13/355,914, Oct. 28, 2014, 18 pages.
"Non-Final Office Action", U.S. Appl. No. 13/397,495, Apr. 3, 2015, 11 pages.
"Non-Final Office Action", U.S. Appl. No. 13/397,516, Jun. 12, 2014, 11 pages.
"Non-Final Office Action", U.S. Appl. No. 13/397,516, Nov. 25, 2013, 10 pages.
"Non-Final Office Action", U.S. Appl. No. 13/397,539, Mar. 16, 2015, 9 pages.
"Non-Final Office Action", U.S. Appl. No. 13/397,617, May 5, 2015, 6 pages.
"Non-Final Office Action", U.S. Appl. No. 13/397,617, Oct. 9, 2014, 6 pages.
"Non-Final Office Action", U.S. Appl. No. 13/428,879, Feb. 24, 2015, 10 pages.
"Non-Final Office Action", U.S. Appl. No. 13/428,879, Mar. 17, 2014, 10 pages.
"Non-Final Office Action", U.S. Appl. No. 13/428,879, Jun. 26, 2015, 13 pages.
"Non-Final Office Action", U.S. Appl. No. 13/432,311, Jun. 2, 2015, 25 pages.
"Non-Final Office Action", U.S. Appl. No. 13/432,311, Jul. 8, 2014, 33 pages.
"Non-Final Office Action", U.S. Appl. No. 13/432,372, May 9, 2014, 26 pages.
"Non-Final Office Action", U.S. Appl. No. 13/432,372, Oct. 24, 2014, 27 pages.
"Non-Final Office Action", U.S. Appl. No. 13/440,165, Feb. 13, 2015, 10 pages.
"Non-Final Office Action", U.S. Appl. No. 13/440,165, Oct. 16, 2014, 11 pages.
"Non-Final Office Action", U.S. Appl. No. 13/477,646, Jun. 18, 2015, 43 pages.
"Non-Final Office Action", U.S. Appl. No. 13/477,646, Oct. 6, 2014, 34 pages.
"Non-Final Office Action", U.S. Appl. No. 13/477,646, Nov. 22, 2013, 20 pages.
"Non-Final Office Action", U.S. Appl. No. 13/525,649, Jan. 29, 2014, 7 pages.
"Non-Final Office Action", U.S. Appl. No. 13/525,649, Feb. 5, 2015, 7 pages.
"Non-Final Office Action", U.S. Appl. No. 13/525,649, Jun. 5, 2014, 7 pages.
"Non-Final Office Action", U.S. Appl. No. 13/570,073, Jan. 23, 2015, 7 pages.
"Non-Final Office Action", U.S. Appl. No. 13/631,308, Feb. 23, 2015, 9 pages.
"Non-Final Office Action", U.S. Appl. No. 13/722,917, May 21, 2015, 12 pages.
"Non-Final Office Action", U.S. Appl. No. 13/774,875, Nov. 24, 2014, 8 pages.
"Non-Final Office Action", U.S. Appl. No. 14/134,993, Jan. 22, 2015, 17 pages.
"Non-Final Office Action", U.S. Appl. No. 14/134,993, Apr. 17, 2014, 34 pages.
"Notice of Allowance", U.S. Appl. No. 13/336,895, Aug. 11, 2014, 6 pages.
"Notice of Allowance", U.S. Appl. No. 13/343,675, Sep. 16, 2013, 8 pages.
"Notice of Allowance", U.S. Appl. No. 13/355,836, Jun. 13, 2014, 11 pages.
"Notice of Allowance", U.S. Appl. No. 13/355,836, Oct. 8, 2014, 11 pages.
"Notice of Allowance", U.S. Appl. No. 13/356,545, Mar. 28, 2014, 6 pages.
"Notice of Allowance", U.S. Appl. No. 13/488,145, Nov. 19, 2014, 8 pages.
"Restriction Requirement", U.S. Appl. No. 13/355,836, Sep. 27, 2013, 6 pages.
"Restriction Requirement", U.S. Appl. No. 13/397,539, Dec. 1, 2014, 6 pages.
"Restriction Requirement", U.S. Appl. No. 13/488,145, Sep. 8, 2014, 14 pages.
"Restriction Requirement", U.S. Appl. No. 13/570,073, Nov. 18, 2014, 7 pages.
"Supplemental Notice of Allowance", U.S. Appl. No. 13/356,545, Jul. 22, 2014, 2 pages.
"Supplementary European Search Report", EP Application No. 13769961.7, Mar. 3, 2015, 3 pages.
"Two-Faced: Transparent Phone with Dual Touch Screens", Retrieved from <http://gajitz.com/two-faced-transparent-phone-with-dual-touch-screens/>, Jun. 7, 2012, 3 pages.
"Variable Groove Depth (VGD) Master Gratings", Retrieved From: <http://www.horiba.com/scientific/products/diffraction-gratings/catalog/variable-groove-depth-vgd/> May 28, 2014, 2 pages.
"Written Opinion", Application No. PCT/US2013/061225, Oct. 10, 2014, 6 Pages.
Allen,"ELiXIR—Solid-State Luminaire with Enhanced Light Extraction by Internal Reflection", Journal of Display Technology, vol. 3, No. 2, Available at <http://www.nanolab.uc.edu/Publications/PDFfiles/355.pdf>, Jun. 2007, pp. 155-159.
Aron,"'Sprinting' chips could push phones to the speed limit", New Scientist, Feb. 20, 2012, Issue #2852, Feb. 20, 2012, 2 pages.
Baluja,"Non-Intrusive Gaze Tracking Using Artificial Neural Networks", Technical Report CMU-CS-94-102, Available at <http://citeseerx.ist.psu.edu/viewdoc/download?doi=10.1.1.33.4027&rep=rep1&type=pdf>, Jan. 5, 1994, 14 pages.
Barger,"COTS Cooling", Publication of the National Electronics Manufacturing Center of Excellence, Retrieved from: <http://www.empf.org/empfasis/2009/Oct09/cots.html> on Jul. 9, 2012, Oct. 2009, 4 pages.
Baudisch,"Back-of-Device Interaction Allows Creating Very Small Touch Devices", In Proceedings of 27th International Conference on Human Factors in Computing Systems, Retrieved from <http://citeseerx.ist.psu.edu/viewdoc/download?doi=10.1.1.160.3337&rep=rep1&type=pdf>, Apr. 2005, 10 pages.
Baxtor,"TwinTech GeForce GTS 250 XT OC 1GB Graphics Card", retrieved from <http://www.tweaktown.com/reviews/2733/twintech_geforce_gts_250_xt_oc_1gb_graphics_card/index3.html> on Dec. 30, 2011, Apr. 24, 2009, 4 pages.
Chang-Yen,"A Monolithic PDMS Waveguide System Fabricated Using Soft-Lithography Techniques", In Journal of Lightwave Technology, vol. 23, No. 6, Jun. 2005, 6 pages.

(56) References Cited

OTHER PUBLICATIONS

Charles,"Design of Optically Path Length Matched, Three-Dimensional Photonic Circuits Comprising Uniquely Routed Waveguides", In Proceedings of Applied Optics, vol. 51, Issue 27, Sep. 20, 2012, 11 pages.

Chen,"A Study of Fiber-to-Fiber Losses in Waveguide Grating Routers", In Journal of Lightwave Technology, vol. 15, No. 10, Oct. 1997, 5 pages.

Chen,"Strategies for 3D Video with Wide Fields-of-View", IEEE Proceeding Optoelectronics, vol. 148, Issue 2, Available at <http://ieeexplore.ieee.org/stamp/stamp.jsp?tp=&arnumber=926823>, Apr. 2001, pp. 85-90.

Cheng,"Waveguide Displays Based on Polymer-dispersed Liquid Crystals", SPIE Newsroom, Available at <http://spie.org/documents/Newsroom/Imported/003805/003805_10.pdf>, Aug. 12, 2011, 2 pages.

Chirgwin,"Researchers propose 'overclock' scheme for mobiles—Processing at a sprint to overcome tech limitations", The Register, Feb. 21, 2012, 2 pages.

Coldewey,"Researchers Propose "Computational Sprinting" To Speed Up Chips By 1000%—But Only for a Second", TechCrunch, Feb. 28, 2012, 2 pages.

Cottier,"Label-free Highly Sensitive Detection of (small) Molecules by Wavelength Interrogation of Integrated Optical Chips", n Proceedings of Sensors and Actuators B: Chemical, vol. 91, Issue 1-3, Jun. 1, 2003, pp. 241-251.

DeAgazio,"Selecting Display Backlighting for Portable, Handheld Devices", Hearst Electronics Products, retrieved from <http://www2.electronicproducts.com/Selecting_display_backlighting_for_portable_handheld_devices-article-farcglobal-feb2008-html.aspx> on Jan. 12, 2012, Jan. 2, 2008, 4 pages.

Dumon,"Compact Arrayed Waveguide Grating Devices in Silicon-on-Insulator", In Proceedings of the IEEE/LEOS Symposium Benelux Chapter, May 27, 2014, 4 pages.

Eadicicco,"First Transparent Tablet Lets You Touch From Both Sides", Retrieved from <http://blog.laptopmag.com/first-transparent-tablet>, Dec. 26, 2013, 4 pages.

Grabarnik,"Concave Diffraction Gratings Fabricated With Planar Lithography", In Proceedings of SPIE, vol. 6992, May 3, 2008, 8 pages.

Greenemeier,"Could "Computational Sprinting" Speed Up Smart Phones without Burning Them Out?", Scientific American, Feb. 29, 2012, 2 pages.

Greiner,"Bandpass engineering of lithographically scribed channel-waveguide Bragg gratings", In Proceedings of Optics Letters, vol. 29, No. 8, Apr. 15, 2004, pp. 806-808.

Han,"Accurate diffraction efficiency control for multiplexed volume holographic gratings", Retrieved at: opticalengineering.spiedigitallibrary.org/data/Journals/.../2799_1, 2002, 4 pages.

Hua,"Engineering of Head-mounted Projective Displays", In Proceedings of Applied Optics, vol. 39, No. 22, Aug. 1, 2000, 11 pages.

Ismail,"Improved Arrayed-Waveguide-Grating Layout Avoiding Systematic Phase Errors", In Proceedings of Optics Express, vol. 19, No. 9, Apr. 25, 2011, pp. 8781-8794.

Jacques,"Polarized Light Imaging of Tissue", Available at <http://www.lumamed.com/documents/5_polarized%20light%20imaging.pdf>, 2004, 17 pages.

Jarvenpaa,"Compact near-to-eye display with integrated gaze tracker", Second International Conference on Computer Engineering and Applications, Mar. 19, 2010, 9 pages.

Jaworski,"A Novel Design of Heat Sink with PCM for Electronics Cooling", 10th International Conference on Thermal Energy Storage, Stockton, May 31-Jun. 2, 2006, retrieved from <https://intraweb.stockton.edu/eyos/energy_studies/content/docs/FINAL_PRESENTATIONS/4b-6%20.pdf> on Jan. 5, 2012, May 31, 2006, 8 pages.

Karp,"Planar Micro-optic Solar Concentration using Multiple Imaging Lenses into a Common Slab Waveguide", In Proceedings of SPIE vol. 7407, Available at <http://psilab.ucsd.edu/research/slab_concentration/files/SPIE_Slab_Published.pdf>, Jan. 2009, 11 pages.

Kress,"Exit Pupil for Wearable See-through displays", Downloaded From: http://proceedings.spiedigitallibrary.org/ on Jan. 31, 2015 Terms of Use: http://spiedl.org/terms, 2012, 8 pages.

Krishnan,"A Novel Hybrid Heat Sink Using Phase Change Materials for Transient Thermal Management of Electronics", IEEE transactions on components and packaging technologies, vol. 28, No. 2, retrieved from <http://ieeexplore.ieee.org/stamp/stamp.jsp?tp=&arnumber=1432936> on Jan. 5, 2012, Jun. 2005, pp. 281-289.

Lanman,"Near-eye Light Field Displays", In Journal of ACM Transactions on Graphics, vol. 32, No. 6, Nov. 2013, 10 pages.

Large,"Parallel Optics in Waveguide Displays: a Flat Panel Autostereoscopic", Display Technology, Journal of, Retrieved from <http://download.microsoft.com/download/D/2/E/D2E425F8-CF3C-4C71-A4A2-70F9D4081007/ParallelOpticsinWaveguideDisplaysMS090925.Final.pdf>, Jun. 21, 2010, pp. 1-7.

Lerner,"Penn Helps Rethink Smartphone Design With 'Computational Sprinting'", Penn News Release, Feb. 28, 2012, 2 pages.

Li,"Design Optimization of Reflective Polarizers for LCD Backlight Recycling", Journal of Display Technology, vol. 5, No. 8, Available at <http://ieeexplore.ieee.org/stamp/stamp.jsp?tp=&arnumber=5196840 >, Aug. 2009, pp. 335-340.

Li,"Switchable Electro-optic Diffractive Lens with High Efficiency for Ophthalmic Applications", PNAS Apr. 18, 2006 vol. 103 No. 16 6100-6104, Retrieved from: <http://www.pnas.org/content/103/16/6100.long> Feb. 22. 2012, Feb. 2, 2006, 4 pages.

Lindau,"Controlling The Groove Depth Of Holographic Gratings", In Proceedings of Optical System Design, Analysis, and Production, vol. 0399, Oct. 26, 1983, 2 pages.

Man,"IT Equipment Noise Emission Standards: Overview of New Development in the Next Edition of ISO/ECMA Standards", In Proceedings of 37th International Congress and Exposition on Noise Control Engineering, Available at <http://www.ecma-international.org/activities/Acoustics/Inter-noise%202008%20paper%20on%20ECMA-74%20updates.pdf >, Oct. 26, 2008, 8 pages.

Massenot,"Multiplexed holographic transmission gratings recorded in holographic polymer-dispersed liquid crystals: static and dynamic studies", Retrieved at: http://oatao.univ-toulouse.fr/2874/, 2005, 8 pages.

McMillan,"Your Future iPhone May Be Stuffed With Wax", Aug. 23, 2013, 3 pages.

Mei,"An all fiber interferometric gradient hydrophone with optical path length compensation", In Proceedings of Summaries of Papers Presented at the Conference on Lasers and Electro-Optics, May 28, 1999, 2 pages.

Melcher,"LCoS for High Performance Displays", In Proceedings of LEOS 2003, Available at <http://ieeexplore.ieee.org/stamp/stamp.jsp?tp=&arnumber=1253048>, Oct. 27, 2003, pp. 812-813.

Minier,"Diffraction Characteristics of Superimposed Holographic gratings in Planar Optical waveguides", IEEE Photonics Technology Letters, vol. 4, No. 10, Oct. 1992, 4 pages.

Moore,"Computational sprinting pushes smartphones till they're tired", Michigan News Release, Feb. 28, 2012, 2 pages.

Morga,"History of Saw Devices", In Proceedings of the IEEE International Frequency Control Symposium, May 27, 1998, 22 pages.

Nguyen,"Advanced Cooling System Using Miniature Heat Pipes in Mobile PC", IEEE Transactions on Components and Packaging Technology, vol. 23, No. 1, Available at <http://ieeexplore.ieee.org/stamp/stamp.jsp?tp=&arnumber=833046&userType=inst>, Mar. 2000, pp. 86-90.

Owano,"Study explores computing bursts for smartphones", PhysOrg.com, Feb. 21, 2012, 2 pages.

Papaefthymiou,"Computational Sprinting on a Hardware/Software Testbed", In the Proceedings of the 18th Eighteenth International Conference on Architectural Support for Programming Languages and Operating Systems (ASPLOS), Mar. 2013., 12 pages.

(56) References Cited

OTHER PUBLICATIONS

Patrizio,"Researchers Working on Ways to Put 16-Core Processors in Smartphones", Brighthand, Mar. 18, 2012, 2 pages.
Pu,"Exposure schedule for multiplexing holograms in photopolymer films", Retrieved at: lo.epfl.ch/webdav/site/lo/shared/1996/OE_35_2824_Oct1996.pdf, Oct. 1996, 6 pages.
Raghavan,"Computational Sprinting", In the Proceedings of the 18th Symposium on High Performance Computer Architecture (HPCA), Feb. 2012, 12 pages.
Raghavan,"Designing for Responsiveness With Computational Sprinting", IEEE Micro's "Top Picks of 2012" Issue, May 2013, 8 pages.
Scott,"RearType: Text Entry Using Keys on the Back of a Device", In Proceedings of 12th Conference on Human-Computer Interaction with Mobile Devices and Services, Retrieved from <https://research.microsoft.com/pubs/135609/reartype%20mobilehci.pdf>, Sep. 7, 2010, 9 pages.
Singh"Laser-Based Head-Tracked 3D Display Research", Journal of Display Technology, vol. 6, No. 10, Available at <http://ieeexplore.ieee.org/stamp/stamp.jsp?tp=&arnumber=5462999>, Oct. 2010, pp. 531-543.
Smalley,"Anisotropic Leaky-Mode Modulator for Holographic Video Displays", In Proceedings of Nature, vol. 498, Jun. 20, 2013, 6 pages.
Stupar,"Optimization of Phase Change Material Heat Sinks for Low Duty Cycle High Peak Load Power Supplies", IEEE transactions on components, packaging and manufacturing technology, retrieved from <http://ieeexplore.ieee.org/stamp/stamp.jsp?tp=&arnumber=6081913> on Jan. 5, 2012, Nov. 15, 2011, 14 pages.
Tari,"CFD Analyses of a Notebook Computer Thermal Management System and a Proposed Passive Cooling Alternative", IEEE Transactions on Components and Packaging Technologies, vol. 33, No. 2, retrieved from <http://ieeexplore.ieee.org/stamp/stamp.jsp?tp=&arnumber=5466211> on Dec. 30, 2011, Jun. 2010, pp. 443-452.
Teng,"Fabrication of nanoscale zero-mode waveguides using microlithography for single molecule sensing", In Proceedings of Nanotechnology, vol. 23, No. 45, Jul. 7, 2012, 7 pages.
Tien,"Microcontact Printing of SAMs", In Proceedings of Thin Films, vol. 24, May 28, 2014, 24 pages.
Travis,"Collimated Light from a Waveguide for a Display Backlight", Optics Express—Retrieved from <http://download.microsoft.com/download/D/2/E/D2E425F8-CF3C-4C71-A4A2-70F9D4081007/OpticsExpressbacklightpaper.pdf>, Oct. 15, 2009, pp. 19714-19719.
Travis,"The Design of Backlights for View-Sequential 3D", Microsoft Corporation, Available at <http://download.microsoft.com/download/D/2/E/D2E425F8-CF3C-4C71-A4A2-70F9D4081007/Backlightforviewsequentialautostereo.docx>, Jul. 3, 2010, 4 pages.
Van"A Survey of Augmented Reality Technologies, Applications and Limitations", The International Journal of Virtual Reality, 2010, 9(2), Available at <http://www.ijvr.org/issues/issue2-2010/paper1%20.pdf>, Jun. 2010, pp. 1-19.
Walker,"Thermalright Ultra—120 Extreme CPU Cooler", retrieved from <http://www.pro-clockers.com/cooling/66-thermalright-ultra-120-extreme-cpu-cooler.html> on Dec. 30, 2011, Jul. 2, 2009, 7 pages.
Westerinen,"Light Guide Display and Field of View", U.S. Appl. No. 13/428,879, filed Mar. 23, 2012, 46 pages.
Wigdor,"LucidTouch: A See-Through Mobile Device", In Proceedings of 20th Annual ACM symposium on User Interface Software and Technology, Retrieved from <http://dl.acm.org/citation.cfm?id=1294259>, Oct. 7, 2007, 10 pages.
Xie,"Fabrication of Varied-Line-Spacing Grating by Elastic Medium", In Proceedings SPIE 5636, Holography, Diffractive Optics, and Applications II, Nov. 2004, 4 pages.
Yan,"Multiplexing holograms in the photopolymer with equal diffraction efficiency", 2005, 9 pages.
Zharkova,"Study of the Dynamics of Transmission Gratings Growth on Holographic Polymer-Dispersed Liquid Crystals", International Conference on Methods of Aerophysical Research, ICMAR 2008, 2008, 4 pages.
"Restriction Requirement", U.S. Appl. No. 14/447,419, Aug. 4, 2015, 6 pages.
"Adobe Audition / Customizing Workspaces", Retrieved From: <http://help.adobe.com/en_US/audition/cs/using/WS9FA7B8D7-5991-4e05-B13C-4C85DAF1F051.html> Jul. 5, 2014, May 18, 2011, 6 Pages.
"Always Connected", Available at: http://www.samsung.com/global/microsite/galaxycamera/nx/, Jun. 24, 2013, 5 pages.
"Controlling Your Desktop's Power Management", Retrieved From: <http://www.vorkon.de/SU1210.001/drittanbieter/Dokumentation/openSUSE_11.2/manual/sec.gnomeuser.start.power_mgmt.html> Jul. 7, 2014, 6 Pages.
"Display Control", Retrieved From: <http://www.portrait.com/technology/display-control.html> Jul. 4, 2014, Jun. 24, 2013, 5 Pages.
"Manage Multiple Windows", Retrieved From: <http://windows.microsoft.com/en-hk/windows/manage-multiple-windows#1TC=windows-7> Jul. 8, 2014, 4 Pages.
"Merge Operator", Retrieved on: Jun. 3, 2014, Available at: https://github.com/facebook/rocksdb/wiki/Merge-Operator, 10 pages.
"Non-Final Office Action", U.S. Appl. No. 13/774,875, Sep. 16, 2015, 8 pages.
"Organize Your Desktop Workspace for More Comfort with Window Space", Retrieved From: <http://www.ntwind.com/software/windowspace.html> Jul. 4, 2014, Sep. 19, 2008, 5 Pages.
"SizeUp The Missing Window Manager", Retrieved From: <https://www.irradiatedsoftware.com/sizeup/> Jul. 4, 2014, Jan. 17, 2013, 4 Pages.
"Using Flickr to Organize a Collection of Images", Available at: http://www.jiscdigitalmedia.ac.uk/guide/using-flickr-to-organise-a-collection-of-images, Apr. 2, 2013, 17 pages.
"Window Magnet", Retrieved From: <http://magnet.crowdcafe.com/> Jul. 4, 2014, Jun. 23, 2011, 2 Pages.
"Windows 7: Display Reminder When Click on Shutdown?", Retrieved From: <http://www.sevenforums.com/customization/118688-display-reminder-when-click-shutdown.html> Jul. 8, 2014, Oct. 18, 2010, 5 Pages.
"Working with Windows", Retrieved From: <http://windows.microsoft.com/en-us/windows/working-with-windows#1TC=windows-7> Jul. 4, 2014, 10 Pages.
Ashraf,"Winsplit Revolution: Tile, Resize, and Position Windows for Efficient Use of Your Screen", Retrieved From: <http://dottech.org/11240/winsplit-revolution-tile-resize-and-position-windows-for-efficient-use-of-your-screen/> Jul. 8, 2014, Dec. 18, 2011, 4 Pages.
Callaghan,"Types of writes", Available at: http://smalldatum.blogspot.in/2014/04/types-of-writes.html, Apr. 17, 2014, 3 pages.
Cohen,"Automatic Strategies in the Siemens RTL Tiled Window Manager", In Proceedings: The 2nd IEEE Conference on Computer Workstations, Mar. 7, 1988, pp. 111-119.
Eckel,"Personalize Alerts with the Help of OS X Mavericks Notifications", Retrieved From: <http://www.techrepublic.com/article/customize-os-x-mavericks-notifications-to-personalize-alerts/> Jul. 8, 2014, Mar. 10, 2014, 7 Pages.
Elnaka,"Real-Time Traffic Classification for Unified Communication Networks", In Proceedings of International Conference on Selected Topics in Mobile and Wireless Networking, Aug. 19, 2013, 6 pages.
Hepburn,"Color: The Location Based Social Photo App", Available at: http://www.digitalbuzzblog.com/color-the-location-based-social-photo-iphone-app/, Mar. 27, 2011, 12 pages.
Johnson,"Samsung Galaxy Tab Pro 10.1 Review", Retrieved From: <http://hothardware.com/Reviews/Samsung-Galaxy-Tab-Pro-101-Review/?p.=3#!baG2DY> Jul. 9, 2014, Mar. 21, 2014, 10 Pages.
Kandogan,"Elastic Windows: Improved Spatial Layout and Rapid Multiple Window Operations", In Proceedings of the Workshop on Advanced Visual Interfaces, May 27, 1996, 10 Pages.
Levandoski,"Latch-Free, Log-Structured Storage for Multiple Access Methods", U.S. Appl. No. 13/924,567, filed Jun. 22, 2013, 51 pages.

(56) References Cited

OTHER PUBLICATIONS

Levandoski,"The Bw-Tree: A B-tree for New Hardware Platforms", In IEEE 29th International Conference on Data Engineering, Apr. 8, 2013, 12 pages.
Li,"QRON: QoS-Aware Routing in Overlay Networks", In Proceedings of IEEE Journal on Selected Areas in Communications, vol. 22, No. 1, Jan. 2004, 12 pages.
Mack,"Moto X: The First Two Weeks", Retrieved From: <http://www.gizmag.com/two-weeks-motorola-google-moto-x-review/28722/> Jul. 8, 2014, Aug. 16, 2013, 8 pages.
O'Reilly,"How to Use the Microsoft Surface Touch Screen and Keyboard", Retrieved From: <http://www.cnet.com/how-to/how-to-use-the-microsoft-surface-touch-screen-and-keyboard/> Jul. 5, 2014, Nov. 6, 2012, 5 Pages.
Paul,"Three Windows Multitasking Features That Help Maximize Your Screen Space", Retrieved From: <http://www.pcworld.com/article/2094124/three-windows-multitasking-features-that-help-maximize-your-screen-space.html> Jul. 4, 2014, Feb. 4, 2014, 4 Pages.
Prohaska,"Fast Updates with TokuDB", Available at: http://www.tokutek.com/2013/02/fast-updates-with-tokudb/, Feb. 12, 2013, 2 pages.
Thurrott,"Nokia Lumia "Black": Glance 2.0", Retrieved From:<http://winsupersite.com/windows-phone/nokia-lumia-black-glance-20> Jul. 8, 2014, Jan. 11, 2014, 3 Pages.
Vranjes,"Application Window Divider Control for Window Layout Management", U.S. Appl. No. 13/863,369, filed Apr. 15, 2013, 21 pages.
Wiebe,"Using screen space efficiently with Gridmove", Available at: http://lowerthought.wordpress.com/2010/05/15/using-screen-space-efficiently-with-gridmove/, May 15, 2010, 2 pages.
Corrected Notice of Allowance, U.S. Appl. No. 14/617,723, Apr. 20, 2016, 7 pages.
Final Office Action, U.S. Appl. No. 13/774,875, Apr. 22, 2016, 10 pages.
Final Office Action, U.S. Appl. No. 14/447,419, May 17, 2016, 10 pages.
International Search Report and Written Opinion, Application No. PCT/US2016/015496, Apr. 11, 2016, 11 pages.
International Search Report and Written Opinion, Application No. PCT/US2016/015873, May 23, 2016, 11 pages.
International Search Report and Written Opinion, Application No. PCT/US2016/016028, May 25, 2016, 11 pages.
International Search Report and Written Opinion, Application No. PCT/US2016/016241, Apr. 20, 2016, 12 pages.
International Search Report and Written Opinion, Application No. PCT/US2016/015869, May 12, 2016, 12 pages.
International Search Report and Written Opinion, Application No. PCT/US2016/016029, May 12, 2016, 12 pages.
International Search Report and Written Opinion, Application No. PCT/US2016/016027, May 17, 2016, 13 pages.
International Search Report and Written Opinion, Application No. PCT/US2016/015871, Jun. 13, 2016, 13 pages.
International Search Report and Written Opinion, Application No. PCT/US2016/019006, May 12, 2016, 14 pages.
International Search Report and Written Opinion, Application No. PCT/US2016/016242, May 27, 2016, 14 pages.
International Search Report and Written Opinion, Application No. PCT/US2016/015497, May 19, 2016, 17 pages.
Non-Final Office Action, U.S. Appl. No. 14/335,927, Jun. 3, 2016, 8 pages.
Non-Final Office Action, U.S. Appl. No. 14/617,606, May 23, 2016, 12 pages.
Notice of Allowance, U.S. Appl. No. 14/617,723, May 24, 2016, 7 pages.
Notice of Allowance, U.S. Appl. No. 14/617,735, Apr. 5, 2016, 12 pages.
Restriction Requirement, U.S. Appl. No. 14/617,683, May 9, 2016, 6 pages.
Kim,"Determination of small angular displacement by moire fringes of matched radial-parallel gratings", Applied Optics, vol. 36, No. 13, May 1997, 8 pages.
Levola,"Diffractive optics for virtual reality displays", Journal of the Society for Information Display—SID, Jan. 1, 2006, 9 pages.
Theocaris,"Radial Gratings as Moire Gauges", Journal of Physics E. Scientific Instruments, Jun. 1, 1968, 6 pages.
Corrected Notice of Allowance, U.S. Appl. No. 14/617,735, Jun. 20, 2016, 2 pages.
Second Written Opinion, Application No. PCT/US2015/041930, Jun. 21, 2016, 5 pages.

\* cited by examiner

Side view

Plan view

Perspective view

Frontal LOS view during alignment

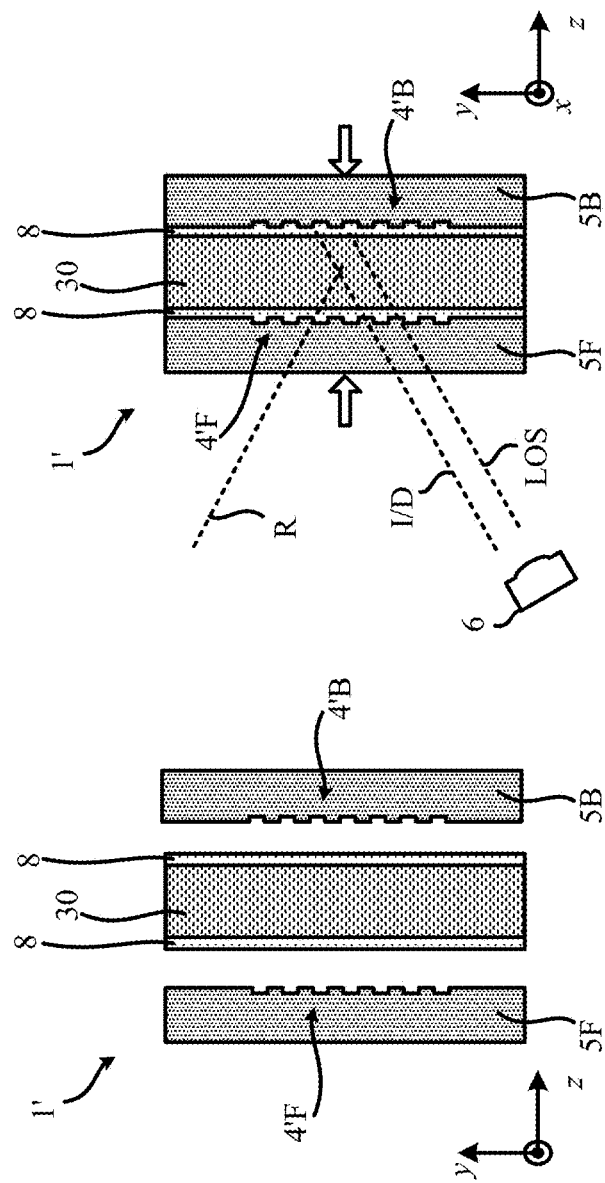

OPTICAL COMPONENTS

BACKGROUND

Optical components can be used in optical systems to alter the state of visible light in a predictable and desired manner, for example in display systems to make a desired image visible to a user. Optical components can interact with light by way of reflection, refractions, diffraction etc. Diffraction occurs when a propagating wave interacts with a structure, such as an obstacle or slit. Diffraction can be described as the interference of waves and is most pronounced when that structure is comparable in size to the wavelength of the wave. Optical diffraction of visible light is due to the wave nature of light and can be described as the interference of light waves. Visible light has wavelengths between approximately 390 and 700 nanometers (nm) and diffraction of visible light is most pronounced when propagating light encounters structures similar scale e.g. of order 100 or 1000 nm in scale.

One example of a diffractive structure is a periodic structure. Periodic structures can cause diffraction of light which is typically most pronounced when the periodic structure has a spatial period of similar size to the wavelength of the light. Types of periodic structures include, for instance, surface modulations on a surface of an optical component, refractive index modulations, holograms etc. When propagating light encounters the periodic structure, diffraction causes the light to be split into multiple beams in different directions. These directions depend on the wavelength of the light thus diffractions gratings cause dispersion of polychromatic (e.g. white) light, whereby the polychromatic light is split into different coloured beams travelling in different directions.

When the period structure is on a surface of an optical component, it is referred to a surface grating. When the periodic structure is due to modulation of the surface itself, it is referred to as a surface relief grating (SRG). An example of a SRG is uniform straight grooves in a surface of an optical component that are separated by uniform straight groove spacing regions. Groove spacing regions are referred to herein as "lines", "grating lines" and "filling regions". The nature of the diffraction by a SRG depends both on the wavelength of light incident on the grating and various optical characteristics of the SRG, such as line spacing, groove depth and groove slant angle. SRGs have many useful applications. One example is an SRG light guide application. A light guide (also referred to herein as a "waveguide") is an optical component used to transport light by way of internal reflection e.g. total internal reflection (TIR) within the light guide. A light guide may be used, for instance, in a light guide-based display system for transporting light of a desired image from a light engine to a human eye to make the image visible to the eye. Incoupling and outcoupling SRGs on surface(s) of the light guide can be used for inputting light to and outputting light from the waveguide respectively.

Surface gratings can be fabricated by way of a suitable microfabrication process to create appropriate surface modulations on a substrate. Microfabrication refers to the fabrication of desired structures of micrometer scales and smaller (such as surface gratings). Microfabrication may involve etching of and/or deposition on a substrate (and possibly etching of and/or deposition on a film deposited on the substrate) to create the desired microstructure on the substrate (or film on the substrate). As used herein, the term "patterning a substrate" or similar encompasses all such etching of/deposition on a substrate or substrate film. Whilst a substrate patterned with a surface grating may be suitable for use as an optical component in an optical system itself, a patterned substrate can also be used as a production masters for manufacturing such optical components. For example, a fused silica substrate (or similar), once patterned with a surface grating, can then be used as part of a moulding component for moulding optical components from polymer e.g. the moulding component may be arranged to provide a moulding cavity with the surface grating on the surface of the cavity. When liquid polymer is forced into the moulding cavity, it is forced into contact with the surface grating so as to imprint the surface grating in the polymer, which then sets to form a solid polymer optical component with the surface grating imprinted on its surface. Thus, large numbers of polymer optical components can be mass-manufactured using the same patterned substrate in an inexpensive, quick and straightforward manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in the Background section.

A first aspect is directed to a moulding process for making a substantially transparent optical component which comprises polymer. The optical component has substantially matching grating imprints on respective portions of its surface. The grating imprints have a substantially zero relative orientation angle. The process comprises the following steps. Substantially transparent molten polymer is forced between two surfaces of a moulding component. The surfaces have surface modulations which form two substantially matching gratings. The molten polymer is forced into contact with the surface modulations so as to imprint the gratings in the polymer. The moulding component is configurable to change the relative orientation angle of the gratings. At least an alignment portion of the moulding component is substantially transparent. The alignment portion is located so that light which has interacted with both gratings is observable from the alignment portion when the substantially transparent polymer is between the surfaces, whereby an observable fringe pattern is formed as the relative orientation angle of the gratings is changed towards zero. The fringe pattern exhibits a fringe spacing which increases as the relative orientation angle decreases. Whilst the polymer is still liquid, the moulding component is reconfigured from a current configuration to a new configuration in which the fringe spacing of the fringe pattern is substantially maximal, thus aligning the gratings to have a substantially zero relative orientation angle. The new configuration is maintained whilst the polymer sets.

A second aspect is directed to a moulding apparatus for moulding a substantially transparent optical component which comprises polymer. The optical component has substantially matching grating imprints on opposing portions of its surface. The grating imprints have a substantially zero relative orientation angle. The apparatus comprises a moulding component, a drive mechanism, a light sensor and a controller. The moulding component has two surfaces, the surfaces having surface modulations which form two substantially matching gratings. The moulding component is configurable to change the relative orientation angle of the gratings. The drive mechanism is coupled to the moulding component and is controllable to configure the moulding component. At least an alignment portion of the moulding component is substantially transparent, the alignment portion located so that light which has interacted with both gratings is observable from the alignment portion when the substantially transparent polymer is between the surfaces, whereby an observable fringe pattern is formed as the relative orientation angle of the gratings is changed towards zero. The fringe pattern exhibits a fringe spacing which increases as the relative orientation angle decreases. The light sensor is configured to receive at least some of the light which has interacted with both gratings. The controller is configured, whilst the polymer is still liquid, to control the drive mechanism based on sensed data received from the image sensor to reconfigure the moulding component from a current configuration to a new configuration in which the fringe spacing of the fringe pattern is substantially maximal, thus aligning the gratings to have a substantially zero relative orientation angle. The new configuration is maintained whilst the polymer sets.

Products obtained by any of the processes disclosed herein are also provided. Such products include an optical component for use in an optical system, which optical component is substantially transparent, formed of polymer, and has substantially matching gratings on opposing portions of its surface, the gratings having a relative orientation angle that is zero to within one thousandth of a degree.

BRIEF DESCRIPTION OF FIGURES

To aid understanding of the subject matter, reference will now be made by way of example only to the following drawings in which:

FIGS. 6A and 6B are side views of a moulding apparatus during a moulding process of another embodiment.

DETAILED DESCRIPTION

Figure 1A:
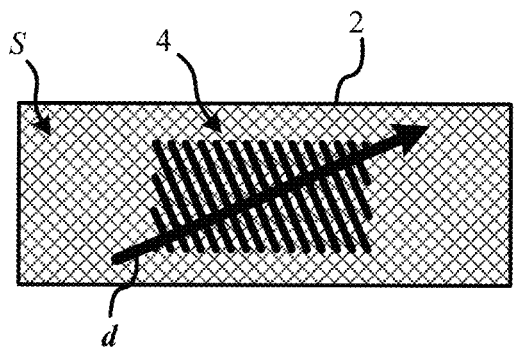
FIG. 1A is a schematic plan view of an optical component.
Figure 1B:
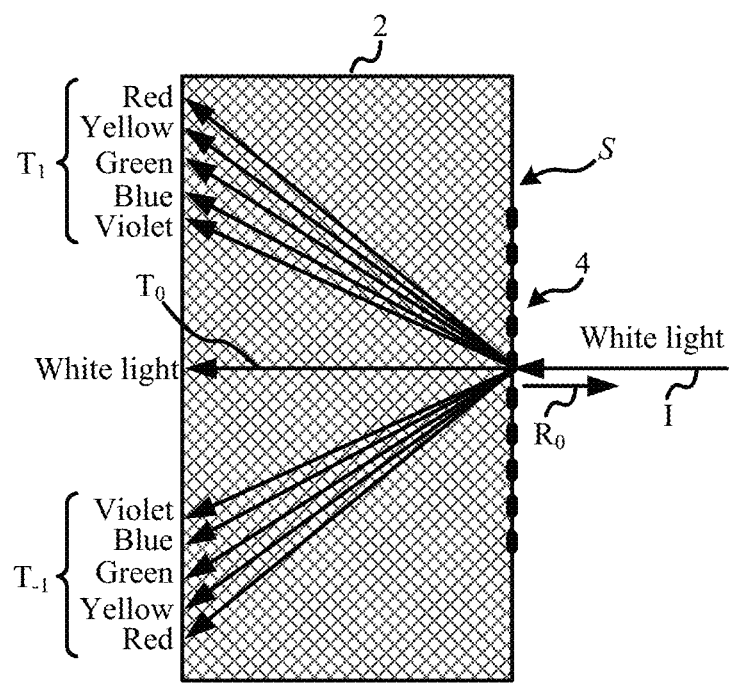
FIG. 1B is a schematic illustration of an optical component, shown interacting with incident light and viewed from the side.

FIGS. 1A and 1B show from the top and the side respectively a substantially transparent optical component 2, such as a wave guide, having an outer surface S. At least a portion of the surface S exhibits surface modulations that form a surface grating 4, which is a SRG. Such a portion is referred to as a "grating area". The modulations comprise grating lines which are substantially parallel and elongate (substantially longer than they are wide), and also substantially straight in this example (though they need not be straight in general).

FIG. 1B shows the optical component 2, and in particular the grating 4, interacting with an incoming illuminating light beam I that is inwardly incident on the SRG 4. The light I is white light in this example, and thus has multiple colour components. The light I interacts with the grating 4 which splits the light into several beams directed inwardly into the optical component 2. Some of the light I may also be reflected back from the surface S as a reflected beam R0. A zero-order mode inward beam T0 and any reflection R0 are created in accordance with the normal principles of diffraction as well as other non-zero-order ($\pm$n-order) modes (which can be explained as wave interference). FIG. 1B shows first-order inward beams T1, T-1; it will be appreciated that higher-order beams may or may not also be created depending on the configuration of the optical component 2. Because the nature of the diffraction is dependent on wavelength, for higher-order modes, different colour components (i.e. wavelength components) of the incident light I are, when present, split into beams of different colours at different angles of propagation relative to one another as illustrated in FIG. 1B.

Figure 2A:
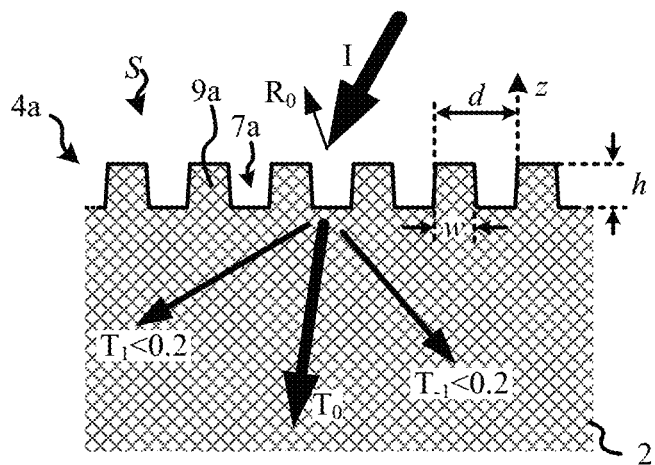
FIG. 2A is a schematic illustration of a straight binary grating, shown interacting with incident light and viewed from the side.
Figure 2B:
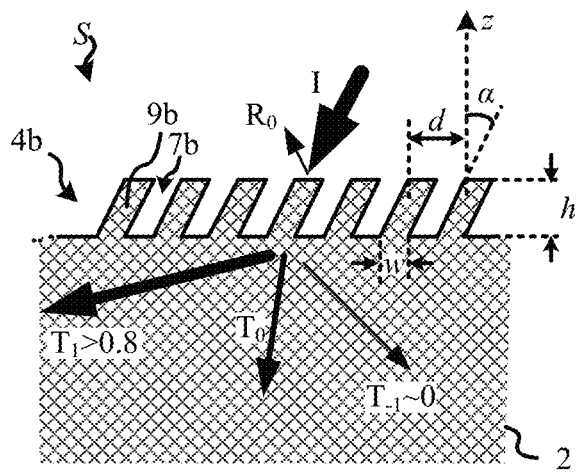
FIG. 2B is a schematic illustration of a slanted binary grating, shown interacting with incident light and viewed from the side.
Figure 2C:
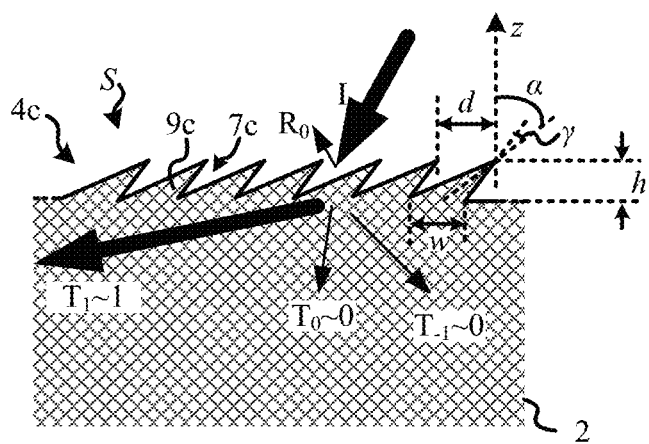
FIG. 2C is a schematic illustration of an overhanging triangular grating, shown interacting with incident light and viewed from the side.

FIGS. 2A-2C are close-up schematic cross sectional views of different exemplary SRGs 4a-4c (collectively referenced as 4 herein) that may be formed by modulations of the surface S of the optical component 2 (which is viewed from the side in these figures). Light beams are denoted as arrows whose thicknesses denote approximate relative intensity (with higher intensity beams shown as thicker arrows).

FIG. 2A shows an example of a straight binary SRG 4a. The straight binary grating 4a is formed of a series of grooves 7a in the surface S separated by protruding groove spacing regions 9a which are also referred to herein as "filling regions", "grating lines" or simply "lines". The grating 4a has a spatial period of d (referred to as the "grating period"), which is the distance over which the modulations' shape repeats. The grooves 7a have a depth h and have substantially straight walls and substantially flat bases. As such, the filling regions have a height h and a width that is substantially uniform over the height h of the filling regions, labelled "w" in FIG. 2A (with w being some fraction f of the period: w=f*d).

For a straight binary grating, the walls are substantially perpendicular to the surface S. For this reason, the grating 4a causes symmetric diffraction of incident light I that is entering perpendicularly to the surface, in that each +n-order mode beam (e.g. T1) created by the grating 4a has substantially the same intensity as the corresponding −n-order mode beam (e.g. T-1), typically less than about one fifth (0.2) of the intensity of the incident beam I.

FIG. 2B shows an example of a slanted binary grating 4b. The slanted grating 4b is also formed of grooves, labelled 7b, in the surface S having substantially straight walls and substantially flat bases separated by lines 9b of width w. However, in contrast to the straight grating 4a, the walls are slanted by an amount relative to the normal, denoted by the angle α in FIG. 2B. The grooves 7b have a depth h as measured along the normal. Due to the asymmetry introduced by the non-zero slant, ±n-order mode inward beams travelling away from the slant direction have greater intensity that their ∓n-order mode counterparts (e.g. in the example of FIG. 2B, the T1 beam is directed away from the direction of slant and has usually greater intensity than the T-1 beam, though this depends on e.g. the grating period d); by increasing the slant by a sufficient amount, those ∓n counterparts can be substantially eliminated (i.e. to have substantially zero intensity). The intensity of the T0 beam is typically also reduced very much by a slanted binary grating such that, in the example of FIG. 2B, the first-order beam T1 typically has an intensity of at most about four fifths (0.8) the intensity of the incident beam I.

The binary gratings $4a$ and $4b$ can be viewed as spatial waveforms embedded in the surface S that have a substantially square wave shape (with period d). In the case of the grating $4b$, the shape is a skewed square wave shape skewed by $\alpha$.

FIG. 2C shows an example of an overhanging triangular grating $4c$ which is a special case of an overhanging trapezoidal grating. The triangular $4c$ is formed of grooves $7c$ in the surface S that are triangular in shape (and which thus have discernible tips) and which have a depth h as measured along the normal. Filling regions $9c$ take the form of triangular, tooth-like protrusions (teeth), having medians that make an angle $\alpha$ with the normal ($\alpha$ being the slant angle of the grating $4c$). The teeth have tips that are separated by d (which is the grating period of the grating $4c$), a width that is w at the base of the teeth and which narrows to substantially zero at the tips of the teeth. For the grating of FIG. $4c$, w≈d, but generally can be w<d. The grating is overhanging in that the tips of the teeth extend over the tips of the grooves. It is possible to construct overhanging triangular grating gratings that substantially eliminate both the transmission-mode T0 beam and the ∓n-mode beams, leaving only ±n-order mode beams (e.g. only T1). The grooves have walls which are at an angle $\gamma$ to the median (wall angle). The grating $4c$ can be viewed as a spatial waveform embedded in S that has a substantially triangular wave shape, which is skewed by a.

The grooves and spacing regions that form the gratings $4a$-$4c$ constitute surface modulations.

Other type of grating are also possible, for example other types of trapezoidal grating patterns (which may not narrow in width all the way to zero), sinusoidal grating patterns etc. and have a modulation width that can be readily defined in a suitable manner. Such other patterns also exhibit depth h, linewidth w, slant angle $\alpha$ and wall angles $\gamma$ which can be defined in a similar manner to FIG. 2A-C.

A grating 4 has a grating vector (generally denoted as d), whose size (magnitude) is the grating period d, and which is in a direction perpendicular to the grating lines which form that grating—see FIG. 1A.

In light guide-based display applications (e.g. where SRGs are used for coupling of light into and out of a light guide of the display system, and/or for providing beam expansion of beams coupled into the waveguide), d is typically between about 250 and 500 nm, and h between about 30 and 400 nm. The slant angle $\alpha$ is typically between about −45 and 45 degrees and is measured in the direction of the grating vector.

FIG. 3A shows a perspective view of an optical component 2 having two separate gratings 4F and 4B on respective portions of the component's surface, which are opposing, substantially parallel and substantially flat. Viewed as in FIG. 3A, these are front and rear portions of the surface. Each of the gratings 4B, 4F is formed of substantially parallel, elongate grating lines and grooved, which are also substantially straight in this example. The gratings 4B, 4F have respective grating periods $d_F$, $d_B$, which may or may not be the same. The gratings 4B, 4F can be of the type described above (and may, but need not be, of the same type).

The gratings 4F and 4B have respective grating vectors $d_F$, $d_B$ (front and back grating vectors) which run parallel to their respective grating lines. A plane 3 is shown, which has a normal $\hat{n}(3)$ (unit vector perpendicular to the plane 3) shown as a dotted arrow. In the example of FIG. 3A, because the front and rear surface portions are substantially parallel, they have substantially the same normals as the plane ($≈\hat{n}(3)$) so that the front and rear surface portions and the plane 3 are all substantially parallel (more generally, for non-parallel surface portions, the plane 3 could be defined to have a normal $\hat{n}(3)$ in the approximate direction of the vector sum of the normals to the front and rear surface portions as this represents a direction of the mean of those normals, which normal $\hat{n}(3)$ is considered to substantially match those normals when so defined).

Figure 3:
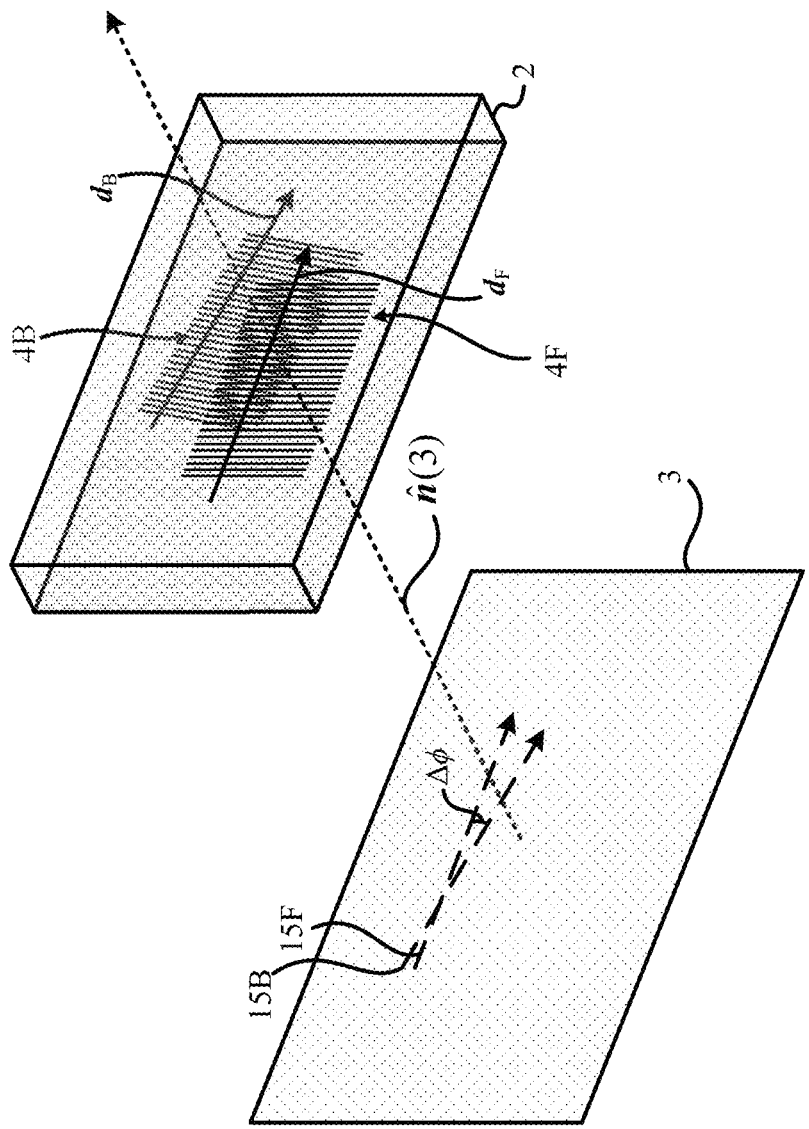
FIG. 3 is a perspective view of an optical component.

Vectors 15F, 15B (shown as dashed arrows) lie in the plane 3, which are geometric projections of the front and back grating vectors $d_F$, $d_B$ onto the plane 3. The projections 15F, 15B have an angular separation $\Delta\phi$, which is an angle in the plane 3 (azimuth), and which is the angular separation of $d_F$, $d_B$ when viewed along the normal $\hat{n}(3)$. The angular separation $\Delta\phi$ is a measure of the relative orientation of the gratings 4F, 4B and is referred to herein as the relative orientation angle of the gratings 4F, 4B. When $\Delta\phi=0$, the grating lines of the gratings 4F, 4B are aligned, at least when viewed along the normal 3', and the gratings 4F, 4B are said to be aligned. In the example of FIG. 3, because the front and rear surface portions are substantially parallel, when $\Delta\phi=0$ the gratings 4F, 4B are aligned when viewed from any viewpoint (more generally, this is true when the gratings 4F, 4B are arranged on opposing surface portions such that their respective grating lines are parallel when $\Delta\phi=0$).

As will be apparent, the value of $\Delta\phi$ affects the optical characteristics of the optical component 2. In waveguide-based display applications, in which the optical component 2 forms part of a waveguide-based display system, misalignment of the gratings (that is deviation from zero in $\Delta\phi$) can—depending on the function of the gratings—cause unwanted distortion of the image.

A moulding process for moulding optical components of the type shown in FIG. 3 from polymer will now be described with reference to FIGS. 4A-4D, which show various views of a moulding apparatus 1 during the process. The polymer is substantially transparent, which makes the process suitable for (among other things) moulding waveguides for waveguide-based display systems (see above).

Figure 4A:
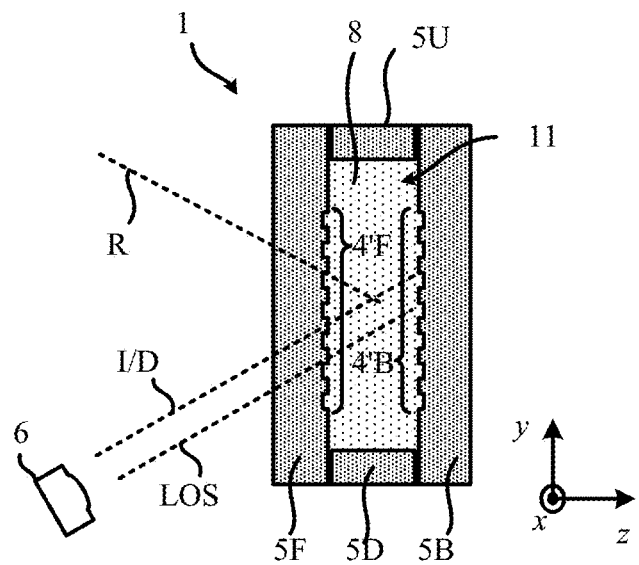
FIGS. 4A, 4B and 4C are side, plan and perspective views of parts of a moulding apparatus respectively.
Figure 4B:
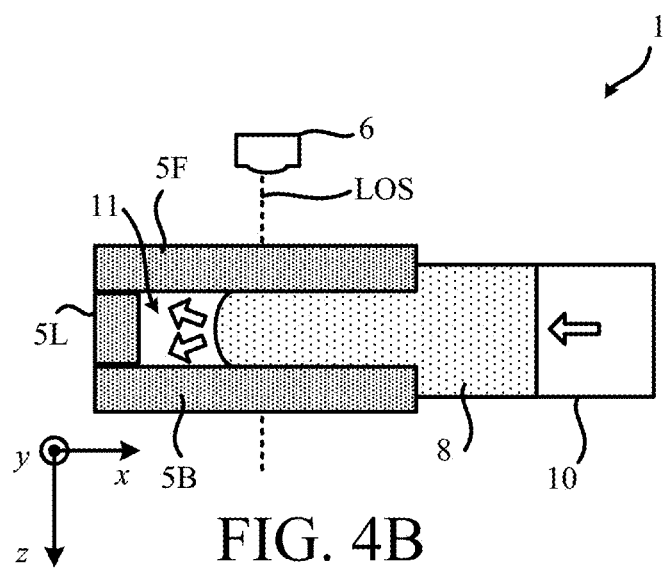

FIG. 4A shows the apparatus 1 from the side. The apparatus comprises blocks 5F, 5B (front, back), 5U, 5D (upper, lower—visible in FIG. 4A only) and 5L (left—visible in FIG. 4B only), which are formed of a rigid material. The reference numeral 5 is used to refer to the blocks collectively. The blocks are arranged in contact so as to form a cavity 11 (moulding cavity), with regions of their surfaces (inner surface regions) forming the surface of the cavity 11. The rigid blocks 5 constitute a moulding component.

Portions of the front and back blocks' inner surface regions are modulated to form respective gratings 4'F, 4'B (front and rear cavity gratings) on each of those inner surface portions, which have structures corresponding to the gratings 4F, 4B of the optical component 2 shown in FIG. 3 respectively—in this case, each cavity grating 4'F, 4'B is formed by surface modulations in the form of substantially parallel, elongate and substantially straight grating lines/ grooves, and have periods $d_F$, $d_B$ respectively. These inner surface portions constitute opposing portions of the surface of the cavity 11, which are also substantially parallel to one another.

The cavity gratings 4'F, 4'B can be patterned on the front and rear blocks 5F, 5B, for instance, by way of a suitable microfabrication process, or they may themselves be moulded from a suitably patterned substrate.

An injection component 10 forces polymer 8 into the moulding cavity 11 (from the right as viewed in FIG. 4B) when the polymer 8 is in a molten (and thus liquid) state. In this manner, the liquid polymer 8 is forced into contact with the front and rear cavity gratings 4'F, 4'B—that is, into contact with the grooved and lines that form those gratings, which has the effect of imprinting the structure of the cavity gratings 4'F, 4'B in the polymer 8. The blocks 5 are sufficiently rigid to resist distortion from the force of the liquid polymer, so the gratings are imprinted undistorted. This is ultimately the mechanism by which the gratings 4F, 4B are formed on the optical component 2, itself formed by the polymer 8 upon setting, and for this reason the gratings 4F, 4B of the final optical component 2 are referred to hereinbelow as front and rear "imprint gratings" or equivalently "grating imprints" 4F, 4B. The front and rear surface portions of the final optical component 2 on which the imprint gratings 4F, 4B are formed correspond to the front and rear surface portions of the moulding cavity. The overall size and shape of the final component 2 matches that of the cavity 11 when the polymer was allowed to set therein.

In FIGS. 4A-4D, the z-direction is that of the normal n̂(3) as defined in relation to the final optical component (which is perpendicular to the cavity surface portions on which the cavity gratings 4'F, 4'B are formed in this example), the xy-plane corresponds to the plane 3 of FIG. 3 (which lies parallel to those cavity surface portions in this example), and the cavity gratings 4'F, 4'B have a relative orientation angle $\Delta\phi'$ that is defined in an equivalent manner to that of the imprint gratings 4F, 4B (i.e. as their angular separation measured in the xy-plane).

The arrangement of the rigid blocks 5 is not fixed: at least one of the front and back blocks 5B, 4F (the back block 5B in this example) is susceptible to xy-rotation whilst still maintaining the integrity of the moulding cavity 11 so that it can be rotated whilst continuing to hold the liquid polymer in the cavity 11. Controlled xy-rotation of the back block 5B is effected by controlling a suitable drive mechanism coupled to the back block 5B. Using commercially available drive mechanisms, it is possible to controller xy-rotation of the back block 5B to effect controlled rotation of the back block 5B by miniscule amounts (fractions of a thousandth of a degree, or less) in a regulated manner.

By adjusting the xy-orientation angle of the front and back blocks 5B, 5F relative to one another so as to adjust the relative orientation angle $\Delta\phi'$ of the cavity gratings 4'F, 4'B, it is possible to precisely align the cavity gratings 4'F, 4'B (that is, to have a substantially zero $\Delta\phi'$) before the polymer 8 sets. By maintaining a substantially zero $\Delta\phi'$ whilst the polymer sets, the imprint gratings 4F, 4B on the optical component 2—as formed when the polymer 8 finished setting—are as aligned with equal precision as (i.e. with substantially zero $\Delta\phi=\Delta\phi'$). The mechanism by which this precise alignment is achieved will now be described with reference to FIGS. 4C and 4D.

Figure 4C:
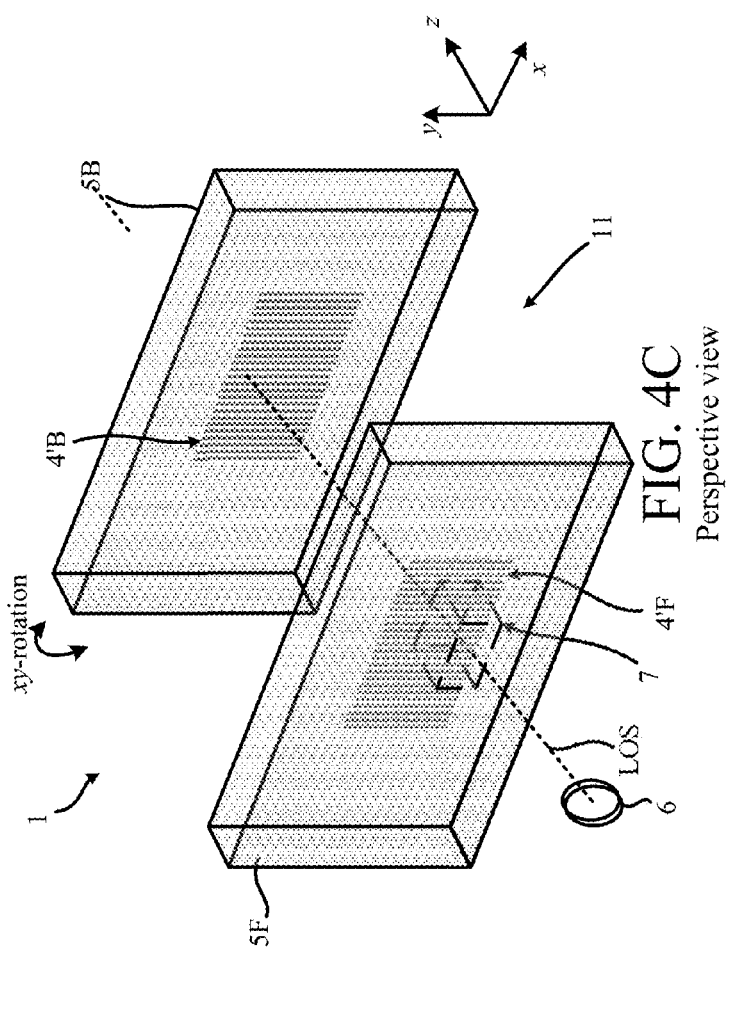

FIG. 4C shows a perspective view of components of the moulding apparatus 1. A light sensor 6 (also shown in FIGS. 4A-4B) is positioned forward of the moulding cavity 5 to receive light propagating towards the sensor along a line of sight (LOS—shown as a dotted line) that has passed through a portion 7 of the moulding component 5 (alignment portion), which is a portion of the front block 4'F in this example. The LOS is oriented so as to intersect both of the cavity gratings 4F, 4B. At least the alignment portion 7 of the moulding component is substantially transparent along the LOS, so that light which has interacted with both gratings can propagate out of the moulding component along the LOS.

The disclosure recognizes that, when the cavity gratings 4'F, 4'B are in near alignment, an observable fringe pattern is formed that is observable along the LOS. A "fringe pattern" means a pattern created when light interacts with two substantially matching gratings (in this cast, the patterns of the cavity gratings 4'F, 4'B, which are perceived to overlap when viewed along the LOS) to create a pattern with fringes, the fringe spacing of which depends on the relative orientation angle of the gratings. The fringe pattern is formed of a series of alternating light and dark fringes, whose spacing increases as the relative orientation angle of the cavity gratings 4'F, 4'B is changed towards zero, at which the fringe spacing become maximal (theoretically infinite were the patterns to be exactly aligned with a relative orientation angle of exactly zero). "Near alignment" means that $\Delta\phi'$ is within a range near zero that the fringe spacing is detectable (i.e. not so close to zero that the fringe spacing is too large to be detectable, but not so far from zero that the fringe spacing is too small to be detectable).

In practice, the Fringe pattern is best observed using diffracted light from the gratings. The diffracted light will generally propagate along almost the same path as the incident light but in the opposite direction. The path along which incident/diffracted light propagates is labelled I/D in FIG. 4A (R denotes the path followed by light reflected from the back grating 4'B) The LOS is substantially parallel to I/D, thus light visible along the LOS will include light which has interacted with both of the cavity gratings 4'F, 4'B, including when the polymer 8 is in the cavity 11 (as the polymer 8 is also substantially transparent and thus permits the passage of such light to the sensor 6). Thus, the sensor 6 is able to receive light from inside the moulding cavity which has interacted with both cavity gratings 4'F, 4'B. In the example of FIG. 4A, this light will have been reflected from the back grating 4'B (the reflected light being of a reflective diffraction mode) before passing through the front grating 4'F.

When the relative orientation angle $\Delta\phi'\approx(5/1000)°$, the fringe pattern will typically have a fringe spacing around 2 mm, which is readily observable. As this angle $\Delta\phi'$ is decreased, the fringe spacing increases to the point at which it becomes substantially maximal—this is the point at the fringe spacing is so large that the pattern is no longer observable because the fringes are larger than the cavity gratings, or at least larger than a portion of the grating being if only that portion is being observed. At this point of substantially maximal fringe spacing, $\Delta\phi'$ is substantially zero—in practice, when $\Delta\phi'$ is no more than about $(0.5*1/1000)°$ to $(1/1000)°$.

This is exploited present moulding process as follows. Whilst the polymer 8 in the moulding cavity 11 is still liquid, the front and back blocks 5B, 5F are brought into near alignment if they are not already in near alignment, so that the fringe pattern is observable along the LOS (current cavity configuration). Their relative orientation angle $\Delta\phi'$ is then fine-tuned until the fringe spacing becomes substantially maximal, at which point $\Delta\phi'$ is substantially zero (new and final cavity configuration). That new configuration (with the substantially zero $\Delta\phi'$) is maintained whilst the polymer 8 sets to form the optical component 2, with the relative orientation angle $\Delta\phi$ of the imprint gratings 4F, 4B being substantially zero (equal to $\Delta\phi'$ as reached in the new and final configuration) in the final component 2.

Figure 4D:
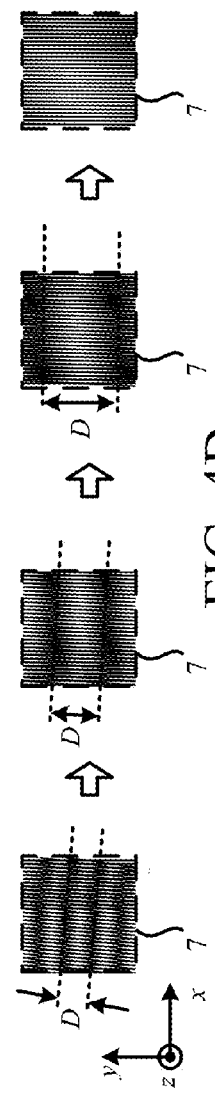
FIG. 4D shows various views of a fringe observed at different points in time during a moulding process of one embodiment.

FIG. 4D shows views of the alignment portion 7 along the LOS at various points in time during the moulding process. A fringe pattern is visible at these points in time, which exhibits a changing fringe spacing D. The left-most view represents a view at a point in time when the gratings are in near alignment. Moving to the right, views are shown at points in time as the relative orientation angle $\Delta\phi'$ is changed towards zero (with D increasing accordingly) until reaching the point at which D is substantially maximal as shown in the left-most view (which represents an exemplary view in or near the new and final configuration).

In practice, visibility of the fringe pattern can be increased by suitable illumination of the apparatus. For instance, to enhance the visibility of the fringe pattern, a laser (not shown) may be used to provide a beam that is directed towards the alignment portion 7. The beam is reflectively diffracted back of the back grating 4'B and the diffracted beam then passes thought the front grating 4'F towards the sensor 6. A beam expander (not shown) may be used to expand the beam before reaching the alignment portion 7, so as to increase the area over which the visibility is enhanced. For example, the beam may be expanded to encompass the cavity gratings 4'F, 4'B to provide the enhanced visibility of the fringe patterns over the full extent of the cavity gratings 4'F, 4'B. Curved components can be made using a curved mould i.e. the surfaces of the moulding component on which the gratings 4'F and 4'B care formed can be curved, whereby the curvature is imparted to the polymer as well as the structure of the gratings 4'f, 4'B.

Figure 5:
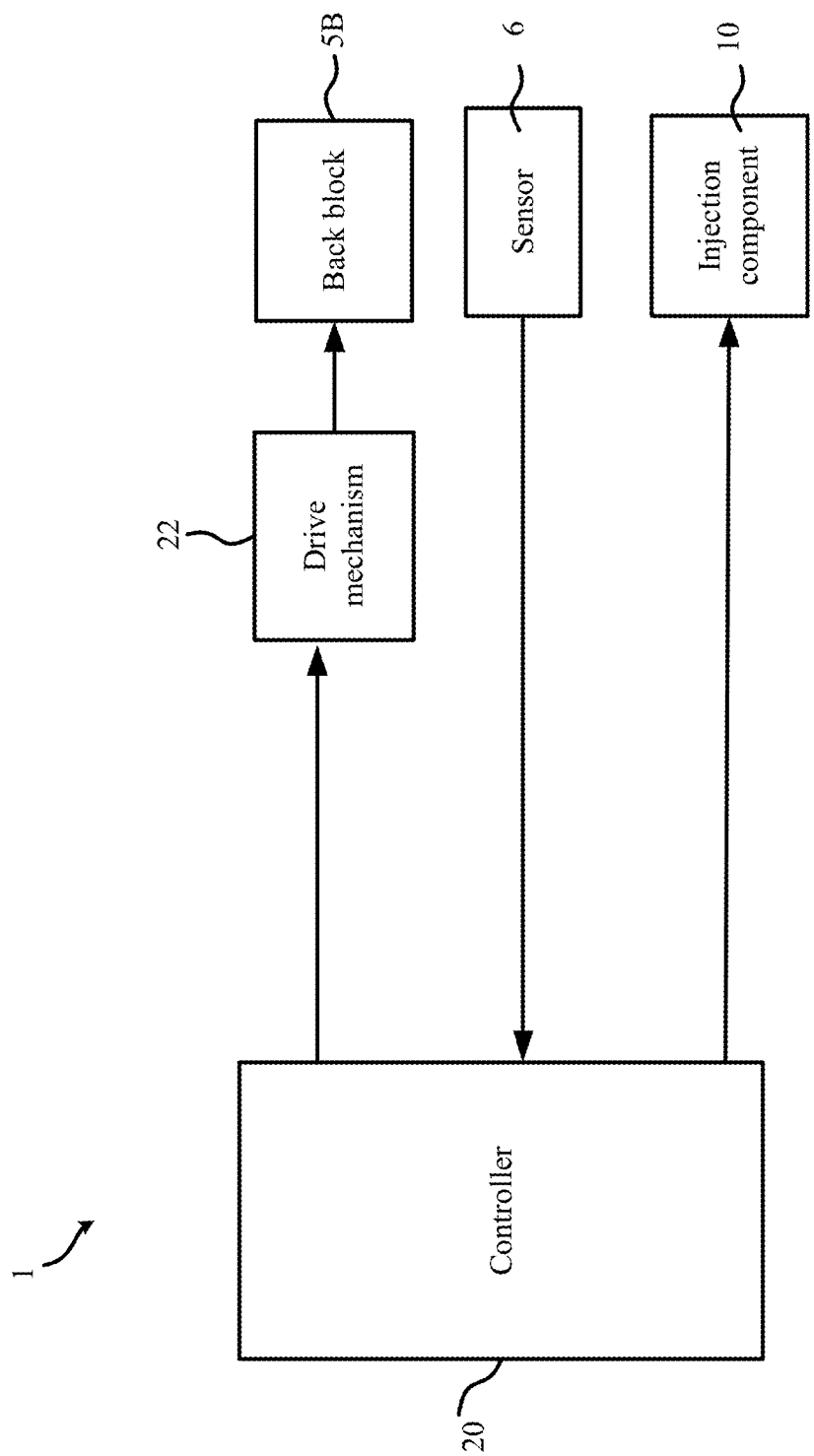
FIG. 5 is a block diagram of a moulding apparatus.

FIG. 5 is a block diagram of the moulding apparatus 1, which comprises a controller 20 connected to control both the drive mechanism 22 and the injection component 10, and to receive sensed data from the sensor 6. The drive mechanism is coupled to at least one of the back blocks 5F, 5B that form part of the moulding component (back block 5B in this example) for fine-tuning the relative orientation angle $\Delta\phi'$ of the front and back cavity gratings 4'B, 4'B. The controller 20 can adjust $\Delta\phi'$ automatically by controlling the drive mechanism 22, once it has controlled the injection component 10 force the polymer 8 into the cavity 11.

The controller 20 receives the sensed data from the sensor 6, and adjusts the relative orientation angle $\Delta\phi'$ of the front and back cavity gratings 4'B, 4'F based on the sensed data until $\Delta\phi'$ is substantially zero by effecting the procedure outlined above. The controller may be implemented by code executed on a processor.

In a first embodiment, the sensor 6 comprises an image sensing component in the form of a camera, which supplies images of the alignment portion 7, taken along the LOS, to the controller 20 (such images capturing the views shown in FIG. 4D). The controller comprises an image recognition module which performs an automatic image recognition procedure on the received images to detect the fringes of the fringe pattern when captured in the images. The controller adjusts $\Delta\phi'$ until the results of the image recognition procedure indicate that the fringe spacing D is maximal, and maintains that $\Delta\phi'$ until the polymer has set.

When illuminated with the laser beam, the fringe pattern is formed by light of the laser beam which has interacted with both gratings. The fringe pattern may not, and need not, be visible on any surface of either mould as the fringe pattern obtained with expanded laser beam can be recorded directly to a pixelated detector (for example, an array of individual pixel detectors), i.e. light reflected back from both alignment gratings interferes and creates the fringe patters on a detection surface of detector. The detector for example may part of the camera. In this manner, the pattern is observed on the surface of a detector instead on the surface of the moulds. The detector is used to detect the fringe spacing as created on the detector, and the moulding process is controlled based on the detected fringe spacing to align the gratings to the maximal fringe spacing.

In a second embodiment, the sensor 6 comprises a photodiode, which is shielded from surrounding light but for a small pinhole—e.g. having a diameter ~1 mm (order of magnitude)—through which only a small portion of the fringe pattern is observable. That is, such that the only light received by the photodiode is from a small portion of the fringe pattern the size of the pinhole, so that once the cavity gratings are in near alignment, the fringes are larger than the pinhole. The controller 20 then changes $\Delta\phi'$, e.g. at a uniform rate. As the cavity gratings 4'F, 4'B are brought into alignment, the fringe spacing increases, which effectively results in movement of the fringes (this is evident in FIG. 4D). Thus the intensity of the light received by the photodiode oscillates between high (when only part of a light fringe is observable through the pinhole) and low (when only part of a dark fringe is perceivable through the pinhole) as $\Delta\phi'$ is changed. As the fringe spacing increases, the rate of this oscillation will decrease due to the light and dark fringes becoming progressively larger so that the rate of oscillation is minimal as $\Delta\phi'$ becomes substantially zero—in the second embodiment, the controller adjusts $\Delta\phi'$ until that minimum rate of oscillation is achieved, and maintains that $\Delta\phi'$ until the polymer has set.

In some optical components, it may be desirable to have additional surface gratings that have a relative orientation angle, which does not deviate from a non-zero amount $\Phi$ by more than an amount which is substantially zero (i.e. which is $\Phi+\Delta\phi$, where $\Delta\phi$ is substantially zero). In this case, the gratings 4'F, 4'D as shown in FIG. 4C can be used in the same way as described above, with a first further grating formed on a distinct portion of the front block's inner surface that is oriented at an angle $\Phi1$ relative to 4'F, and a second further grating formed on a distinct portion of the rear block's inner surface that is oriented at an angle $\Phi2$ relative to 4'B. The angles $\Phi1$, $\Phi2$ are such that $\Phi=|\Phi2-\Phi1|$, which can be achieved to a high level of accuracy using conventional techniques e.g. conventional microfabrication techniques. When the gratings 4'F, 4'B are aligned to have a substantially zero relative orientation angle $\Delta\phi'$ (relative to one another) using the above techniques, the further gratings will have an orientation angle relative to one another that is substantially $\Phi$ i.e. that deviates from $\Phi$ by at most an amount of the order of $\Delta\phi'$ (which is, of course, substantially zero). The further gratings will also be imprinted in the polymer as the polymer is forced into contact with these gratings when liquid in a similar manner to 4'F, 4'B, so that the further gratings as imprinted in the polymer have substantially the desired relative orientation angle $\Phi$.

FIGS. 6A and 6B exemplify an alternative moulding process. In this process a transparent substrate, such as a glass or suitable plastic plate 30. Thin layers of polymer on the substrate are used to replicate the gratings from the mould i.e. the substrate acts as a "back bone" of the optical component and the gratings are formed on thin layers of polymer 8 on the substrate.

FIG. 6A show an alternative moulding apparatus 1' in an initial arrangement, in which the plate 30, having thin layers of liquid polymer 8 deposited on portions of its outer surface, is disposed between two blocks 5F, 5B. These blocks can be substantially the same as in the apparatus of FIGS. 4A-C, with equivalent gratings 4'F, 4'B. The blocks 5F, 5B are then forced towards one another so that the gratings 4'F, 4'B are forced into contact with the liquid polymer layers as shown in FIG. 6B. In this manner, their structure is imprinted in the polymer layers. The relative orientation angle of the modulations 4'F, 4'B is then changed to substantially zero using the fringe pattern formed by the gratings 4'F, 4'B, and remains thus whilst the polymer layers set. The final optical component comprises the plate 30 and the set polymer layers on the plate's surface.

Note that, in this case, the area in which the polymer is imprinted does not necessarily have to be sealed, and the alignment portion could alternatively be an uncovered gap between the components 5F and 5B (e.g. the sensor 6 could be located below the apparatus 1' to receive light reflected of both gratings 4'F, 4'B, the alignment portion being the gap between 5F and 5B at the bottom of the apparatus 1').

As will be apparent, the alternative apparatus 1' does not need an injection component, but otherwise has a similar configuration to that shown in FIG. 5.

Whilst in the above, the exemplary gratings 4F,4B (equivalently 4'F, 4'B) match due to the fact that they are both formed of substantially straight grating lines, in general gratings which are considered to "substantially match" do not necessarily have to be formed of straight grating lines, nor do they have to be formed of identically shaped curved grating lines. In general, two gratings "substantially match" provided some parts of their respective structures are similar enough for it to be possible to create an observable fringe pattern that exhibits a discernible fringe spacing by overlaying those parts (even though other parts of their structure may be markedly different).

Note that the alignment gratings need not overlap, provided it is possible to receive light which has interacted with (e.g. been reflected from) both at a location in space (e.g. at a detector) so that a fringe pattern is formed at that location.

Whilst in the above, gratings are formed on opposing, substantially parallel surfaces, in general the terminology "opposing surfaces portions" (or similar) encompasses surface portions which are not parallel. Note that the definition of the relative orientation angle (azimuth) between two gratings as set out above with reference to FIG. 3B can be applied to gratings on non-parallel surface portions.

Whilst the above has been described with reference to opposing gratings, the techniques can be applied to non-opposing gratings, whereby the fringe pattern is formed for instance by a beam which has been guided by reflection onto both gratings, and which thus interacts with both.

The cavity gratings 4'F, 4'B (and thus the imprint gratings 4F, 4B) can be binary (slanted/non-slanted), sinusoidal, trapezoidal (e.g. triangular) in shape (among others) and need not have the same shape, slant $\alpha$, width w, depth h etc. as one another (though this is not excluded).

Whilst the above considers a substantially software-implemented controller 20, the functionality of the controller can be implemented using software, firmware, hardware (e.g., fixed logic circuitry), or a combination of these implementations. The terms "module," "functionality," "component" and "logic" as used herein generally represent, where applicable, software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the apparatus may also include an entity (e.g. software) that causes hardware of a computer of the apparatus to perform operations, e.g., processors functional blocks, and so on. For example, the computer may include a computer-readable medium that may be configured to maintain instructions that cause the computer, and more particularly the operating system and associated hardware of the computer to perform operations. Thus, the instructions function to configure the operating system and associated hardware to perform the operations and in this way result in transformation of the operating system and associated hardware to perform functions. The instructions may be provided by the computer-readable medium to the computer through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Moreover, whilst the above alignment process is automated, manual or partially manual processes are not excluded.

In embodiments of the various aspects set out above, images of the fringe pattern may be captured as the cavity is reconfigured and an automatic image recognition procedure may be performed to detect the fringe pattern in the images, the step of reconfiguring being based on the results of the image recognition procedure.

Light of only a small portion of the fringe pattern may be sensed as the cavity is reconfigured, the step of reconfiguring being based on the rate at which the intensity of that light changes.

Each of the gratings may lie substantially parallel to a plane, and the gratings may not overlap or may only partially overlap with one another when viewed along a direction normal to the plane.

The gratings may be illuminated with an expanded laser beam, the fringe pattern being formed by light of the laser beam which has interacted with both gratings. The light of the laser beam may for instance be received at a detector, part of the received light having been reflected from one of the gratings and another part of the light having been reflected from the other of the gratings, whereby the part and the other part interfere at the detector to form the fringe pattern on a detection surface of the detector. An output of the detector may be used to control the reconfiguring step.

The opposing portions of the cavity's surface may be substantially parallel, so that the opposing portions of the moulded optical component's surface are substantially parallel.

A first and a second further grating may be formed on other opposing portions of the cavity's surface, the first further grating having a first orientation angle $\Phi 1$ relative to the one of the gratings and the second further grating having a second orientation angle $\Phi 2$ relative to the other of the gratings, so that the first and second further gratings are imprinted in the polymer having a relative orientation angle that is substantially $|\Phi 2-\Phi 1|$ in the new configuration.

At least one of the surfaces of the moulding component may be curved so that the polymer sets in a curved configuration.

The moulding component may be arranged to provide a moulding cavity, the surfaces being of the moulding cavity, and the polymer may be forced into the moulding cavity to force the polymer into contact with the surface modulations, the moulding component reconfigured to the new configuration whilst the polymer in the cavity is still liquid.

The polymer may be arranged in layers on the surface of a substantially transparent substrate, whereby the gratings are imprinted in the layers, the moulding component reconfigured to the new configuration whilst the layers are still liquid, the optical component comprising the substrate and the layers once set.

The light sensor may comprise a camera which captures images of the fringe pattern as the cavity is reconfigured, the controller may comprise an image recognition module which performs an automatic image recognition procedure to detect the fringe pattern in the images, and the controller may reconfigure the cavity based on the results of the image recognition procedure.

The light sensor may sense light of only a small portion of the fringe pattern as the cavity is reconfigured, and the controller may be reconfigured based on the rate at which the intensity of that light changes.

According to a third aspect an optical component for use in an optical system is substantially transparent and has two opposing outer surfaces. At least a respective portion of each of the opposing surfaces is formed of polymer in which a respective grating is imprinted. The gratings substantially match one another and have a relative orientation angle that is zero to within one thousandth of a degree.

The relative orientation angle may for instance be zero to within one half of one thousandth of a degree.

The opposing surface portions may be substantially parallel.

The optical component may be used as a waveguide in a display system to transport light of an image to a user's eye, for example a wearable display system that is wearable by the user.

The gratings may be binary, trapezoidal or sinusoidal in shape.

Another aspect of the subject matter is directed to a moulding apparatus for moulding a substantially transparent optical component which comprises polymer, the optical component having substantially matching grating imprints on opposing portions of its surface, wherein the grating imprints have a substantially zero relative orientation angle, the apparatus comprising: a moulding component having two surfaces, the surfaces having surface modulations which form two substantially matching gratings, wherein the moulding component is configurable to change the relative orientation angle of the gratings; a drive mechanism coupled to the moulding component controllable to configure the moulding component; wherein at least an alignment portion of the moulding component is substantially transparent, the alignment portion located so that light which has interacted with both gratings is observable from the alignment portion when the substantially transparent polymer is between the surfaces, whereby an observable fringe pattern is formed as the relative orientation angle of the gratings is changed towards zero, the fringe pattern exhibiting a fringe spacing which increases as the relative orientation angle decreases, the apparatus further comprising: a light sensor configured to receive at least some of the light which has interacted with both gratings; and a controller configured, whilst the polymer is still liquid, to control the drive mechanism based on sensed data received from the image sensor to reconfigure the moulding component from a current configuration to a new configuration in which the fringe spacing of the fringe pattern is substantially maximal, thus aligning the gratings to have a substantially zero relative orientation angle, wherein the new configuration is maintained whilst the polymer sets.

Yet another aspect is directed to a moulding process for moulding a substantially transparent optical component from polymer, the optical component having substantially matching grating imprints on opposing portions of its surface, wherein the grating imprints have a substantially zero relative orientation angle, the process comprising: forcing substantially transparent molten polymer into a moulding cavity provided by a moulding component, the cavity's surface having surface modulations which form two substantially matching gratings on opposing portions of the cavity's surface, the molten polymer forced into contact with the surface modulations so as to imprint the gratings in the polymer, wherein the cavity is configurable to change the relative orientation angle of the gratings; wherein at least an alignment portion of the moulding component is substantially transparent along a line of sight that intersects both gratings so that light which has interacted with both gratings is observable along the line of sight when the substantially transparent polymer is in the cavity, whereby an observable fringe pattern is formed as the relative orientation angle of the gratings is changed towards zero, the fringe pattern exhibiting a fringe spacing which increases as the relative orientation angle decreases, the process further comprising: whilst the polymer in the cavity is still liquid, reconfiguring the cavity from a current configuration to a new configuration in which the fringe spacing of the fringe pattern is substantially maximal, thus aligning the gratings to have a substantially zero relative orientation angle, wherein the new configuration is maintained whilst the polymer sets.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A moulding process for making a substantially transparent optical component which comprises polymer, the optical component having substantially matching grating imprints on respective portions of its surface, wherein the grating imprints have a substantially zero relative orientation angle, the process comprising:
    forcing substantially transparent molten polymer between two surfaces of a moulding component, the surfaces having surface modulations which form two substantially matching gratings, the molten polymer forced into contact with the surface modulations so as to imprint the gratings in the polymer, wherein the moulding component is configurable to change the relative orientation angle of the gratings;
    wherein at least an alignment portion of the moulding component is substantially transparent, the alignment portion located so that light which has interacted with both gratings is observable from the alignment portion when the substantially transparent polymer is between the surfaces, whereby an observable fringe pattern is formed as the relative orientation angle of the gratings is changed towards zero, the fringe pattern exhibiting a fringe spacing which increases as the relative orientation angle decreases, the process further comprising:

whilst the polymer is still liquid, reconfiguring the moulding component from a current configuration to a new configuration in which the fringe spacing of the fringe pattern is substantially maximal, thus aligning the gratings to have a substantially zero relative orientation angle, wherein the new configuration is maintained whilst the polymer sets.

2. A moulding process according to claim 1 comprising capturing images of the fringe pattern as the cavity is reconfigured and performing an automatic image recognition procedure to detect the fringe pattern in the images, wherein the step of reconfiguring is based on the results of the image recognition procedure.

3. A moulding process according to claim 1 comprising sensing light of only a small portion of the fringe pattern as the cavity is reconfigured, wherein the step of reconfiguring is based on the rate at which the intensity of that light changes.

4. A moulding process according to claim 1 wherein each of the gratings lies substantially parallel to a plane, and the gratings do not overlap or only partially overlap with one another when viewed along a direction normal to the plane.

5. A moulding process according to claim 1 comprising illuminating the gratings with an expanded laser beam, the fringe pattern formed by light of the laser beam which has interacted with both gratings.

6. A moulding process according to claim 5 comprising:
receiving the light of the laser beam at a detector, part of the received light having been reflected from one of the gratings and another part of the light having been reflected from the other of the gratings, whereby the part and the other part interfere at the detector to form the fringe pattern on a detection surface of the detector; and
using an output of the detector to control the reconfiguring step.

7. A moulding process according to claim 1 wherein the opposing portions of the cavity's surface are substantially parallel, so that the opposing portions of the moulded optical component's surface are substantially parallel.

8. A moulding process according to claim 1, wherein a first and a second further grating are formed on other opposing portions of the cavity's surface, the first further grating having a first orientation angle $\Phi 1$ relative to the one of the gratings and the second further grating having a second orientation angle $\Phi 2$ relative to the other of the gratings, so that the first and second further gratings are imprinted in the polymer having a relative orientation angle that is substantially $|\Phi 2-\Phi 1|$ in the new configuration.

9. A moulding process according to claim 1 wherein at least one of the surfaces of the moulding component is curved so that the polymer sets in a curved configuration.

10. A moulding process according to claim 1 wherein the moulding component is arranged to provide a moulding cavity, the surfaces being of the moulding cavity, and wherein the polymer is forced into the moulding cavity to force the polymer into contact with the surface modulations, the moulding component reconfigured to the new configuration whilst the polymer in the cavity is still liquid.

11. A moulding process according to claim 1 wherein the polymer is arranged in layers on the surface of a substantially transparent substrate, whereby the gratings are imprinted in the layers, the moulding component reconfigured to the new configuration whilst the layers are still liquid, wherein the optical component comprises the substrate and the layers once set.

12. A product obtained by the process of claim 1.

13. A moulding apparatus for moulding a substantially transparent optical component which comprises polymer, the optical component having substantially matching grating imprints on opposing portions of its surface, wherein the grating imprints have a substantially zero relative orientation angle, the apparatus comprising:

a moulding component having two surfaces, the surfaces having surface modulations which form two substantially matching gratings, wherein the moulding component is configurable to change the relative orientation angle of the gratings;

a drive mechanism coupled to the moulding component controllable to configure the moulding component;

wherein at least an alignment portion of the moulding component is substantially transparent, the alignment portion located so that light which has interacted with both gratings is observable from the alignment portion when the substantially transparent polymer is between the surfaces, whereby an observable fringe pattern is formed as the relative orientation angle of the gratings is changed towards zero, the fringe pattern exhibiting a fringe spacing which increases as the relative orientation angle decreases, the apparatus further comprising:

a light sensor configured to receive at least some of the light which has interacted with both gratings; and a controller configured, whilst the polymer is still liquid, to control the drive mechanism based on sensed data received from the image sensor to reconfigure the moulding component from a current configuration to a new configuration in which the fringe spacing of the fringe pattern is substantially maximal, thus aligning the gratings to have a substantially zero relative orientation angle, wherein the new configuration is maintained whilst the polymer sets.

14. A moulding apparatus according to claim 13 wherein the light sensor comprises a camera which captures images of the fringe pattern as the cavity is reconfigured, and wherein the controller comprises an image recognition module which performs an automatic image recognition procedure to detect the fringe pattern in the images, wherein the controller reconfigures the cavity based on the results of the image recognition procedure.

15. A moulding apparatus according to claim 13 wherein the light sensor senses light of only a small portion of the fringe pattern as the cavity is reconfigured, and the controller is reconfigured based on the rate at which the intensity of that light changes.

16. An optical component for use in an optical system, wherein the optical component is substantially transparent and has two opposing outer surfaces, wherein at least a respective portion of each of the opposing surfaces is formed of polymer in which a respective grating is imprinted, wherein the gratings substantially match one another and have a relative orientation angle that is zero to within one thousandth of a degree.

17. An optical component according to claim 16, wherein the relative orientation angle is zero to within one half of one thousandth of a degree.

18. An optical component according to claim 16, wherein the opposing surface portions are substantially parallel.

19. An optical component according to claim 16, when used as a waveguide in a display system to transport light of an image to a user's eye.

20. An optical component according to claim 16, when used in a wearable display system that is wearable by the user.

\* \* \* \* \*